(12) United States Patent
Gaona

(10) Patent No.: US 12,291,115 B2
(45) Date of Patent: May 6, 2025

(54) ON-BOARD CHARGING DEVICE FOR ELECTRIC VEHICLE, SYSTEM, AND METHODS FOR WIRELESSLY CHARGING ELECTRIC VEHICLE

(71) Applicant: Huawei Technologies Co., Ltd., Shenzhen (CN)

(72) Inventor: Daniel Gaona, Duesseldorf (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 79 days.

(21) Appl. No.: 18/175,850

(22) Filed: Feb. 28, 2023

(65) Prior Publication Data
US 2023/0202319 A1 Jun. 29, 2023

Related U.S. Application Data

(63) Continuation of application No. PCT/EP2021/067343, filed on Jun. 24, 2021.

(51) Int. Cl.
*B60L 53/22* (2019.01)
*B60L 53/12* (2019.01)
(Continued)

(52) U.S. Cl.
CPC ............... *B60L 53/22* (2019.02); *B60L 53/12* (2019.02); *H01M 10/44* (2013.01);
(Continued)

(58) Field of Classification Search
CPC ...... B60L 53/22; B60L 53/12; B60L 2210/30; B60L 2210/40; B60L 53/14; H01M 10/44;
(Continued)

(56) References Cited

U.S. PATENT DOCUMENTS

| 11,731,520 B2* | 8/2023 | Asa | H02M 5/297 307/104 |
| 2011/0080054 A1* | 4/2011 | Urano | H02J 50/12 307/104 |

(Continued)

OTHER PUBLICATIONS

Khaligh, A., et al., "Global Trends in High.-Power On-Board Chargers for Electric Vehicles", IEEE Transactions on Vehicular Technology, vol. 68, No. 4, Apr. 2019, 20 pages.
(Continued)

*Primary Examiner* — Daniel Cavallari
*Assistant Examiner* — Terrence R Willoughby
(74) *Attorney, Agent, or Firm* — Conley Rose, P.C.

(57) ABSTRACT

An on-board charging (OBC) device for an electric vehicle includes a mains input including a power factor correction (PFC) converter, a mains-side direct current-to-alternating current (DC/AC) converter, a transformer having a mains-side coil and a battery-side coil, a battery-side alternating current-to-direct current (AC/DC) converter, a battery connector and one or more bypass switches configured to galvanically connecting the mains-side converter to the battery-side converter when closed. The transformer is configured to be magnetically coupled to a transmitter (TX) pad of an external wireless power transmitter (WPT), such that power is received by the mains-side coil and the battery side coil. When the bypass switches are closed, and the transformer is magnetically coupled to a WPT, power is sent to the battery connector through both the battery-side converter and the mains-side converter.

20 Claims, 15 Drawing Sheets

(51) Int. Cl.
| | |
|---|---|
| *H01M 10/44* | (2006.01) |
| *H02J 50/00* | (2016.01) |
| *H02J 50/12* | (2016.01) |
| *H02J 50/40* | (2016.01) |
| *H02M 1/42* | (2007.01) |
| *H02M 3/335* | (2006.01) |

(52) U.S. Cl.
CPC ............ *H02J 50/005* (2020.01); *H02J 50/12* (2016.02); *H02J 50/40* (2016.02); *H02M 1/42* (2013.01); *H02M 3/33573* (2021.05); *B60L 2210/30* (2013.01); *B60L 2210/40* (2013.01); *H01M 2220/20* (2013.01); *H02J 2207/20* (2020.01)

(58) Field of Classification Search
CPC .... H01M 2220/20; H02J 50/005; H02J 50/12; H02J 50/40; H02J 2207/20; H02J 7/02; H02J 2310/48; H02M 1/42; H02M 3/33573; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 2012/0056486 A1* | 3/2012 | Endo .................. | H02J 50/12 307/104 |
| 2012/0248890 A1* | 10/2012 | Fukushima ............ | H02J 50/12 307/104 |
| 2013/0093254 A1* | 4/2013 | Urano .................... | H02J 50/12 307/104 |
| 2013/0214591 A1* | 8/2013 | Miller .................... | B60L 53/12 307/104 |
| 2013/0285602 A1 | 10/2013 | Nergaard et al. | |
| 2014/0084862 A1 | 3/2014 | Kawaguchi et al. | |
| 2015/0155095 A1* | 6/2015 | Wu ........................ | H02J 50/10 307/104 |
| 2016/0094081 A1* | 3/2016 | Lee ........................ | H02J 50/12 320/108 |
| 2016/0134131 A1* | 5/2016 | Murayama ............ | B60L 53/126 307/104 |
| 2019/0190299 A1 | 6/2019 | Mohamed et al. | |
| 2023/0182594 A1* | 6/2023 | Ge .......................... | B60L 50/40 307/10.1 |

OTHER PUBLICATIONS

Elshaer, M., et al., "Wireless Power Transfer System Integration with an On-Board Conductive Charger for Plug-in Electric Vehicles," 2020 IEEE, 8 pages.

Chinthavali, M., et al., "All-SiC Inductively Coupled Charger with Integrated Plug-in and Boost Functionalities for PEV Applications", 2016 IEEE Applied Power Electronics Conference and Exposition (APEC), 2016, 8 pages.

Marques, E., et al., "A New Magnetic Coupler For EVs Chargers Based on Plug-In and IPT Technologies", 2017 EEE, 7 pages.

Chinthavali,, M., et al., "Isolated Wired and Wireless Battery Charger with Integrated Boost Converter for PEV Applications," 2015 IEEE Energy Conversion Congress and Exposition (ECCE), 2015, 8 pages.

Sankar, A., et al., "Integrated Inductive and Conductive Charging System for Electric Vehicles", 2019, 147 pages.

Bin Li et al, "High-Frequency PCB Winding Transformer With Integrated Inductors for a Bi-Directional Resonant Converter," IEEE Transactions on Power Electronics, vol. 34, No. 7, Jul. 2019, XP011722071, 13 pages.

* cited by examiner

ON-BOARD CHARGING DEVICE FOR ELECTRIC VEHICLE, SYSTEM, AND METHODS FOR WIRELESSLY CHARGING ELECTRIC VEHICLE

CROSS-REFERENCE TO RELATED APPLICATIONS

This application is a continuation application of International Patent Application No. PCT/EP2021/067343, filed on Jun. 24, 2021, the disclosure of which is hereby incorporated by reference in its entirety.

TECHNICAL FIELD

The present disclosure relates generally to the field of electric vehicles and, more specifically, to an on-board charging (OBC) device for an electric vehicle, an electric vehicle, a system and methods for wirelessly charging the electric vehicle.

BACKGROUND

Generally, the current charging technology for electric vehicles (EVs) may be classified as OBC, off-board charging, and wireless charging (WC). In many ways, the current topologies used in one or more conventional OBC and WC systems are quite similar. To some extent, one could say that a conventional WC is a conventional OBC with a loosely coupled isolation transformer. The integration of the conventional WC and the conventional OBC is preferred as the integration can lead to a partial improvement in power density and a partial reduction in the overall cost of the conventional OBC and WC system.

Currently, various methods have been proposed for the integration of the OBC and the WC. A conventional method of direct current (DC) link sharing has been proposed for integrating the conventional OBC and the conventional WC. In the conventional method of DC-link integration, the conventional OBC and the conventional WC both are connected at the DC-link level resulting in a very low level of integration and higher components count. However, the conventional method of DC-link integration requires no reconfigurable switches. Another conventional method of connection at power factor correction (PFC) level has been proposed for integrating the conventional OBC and the conventional WC. The conventional WC is integrated at the PFC level. When using the conventional WC, the energy is processed by several stages resulting in reduced efficiency. Additionally, the conventional method of connection at the PFC level does not reuse converters, such as conventional alternating current-to-direct current (AC-to-DC) or direct current-to-alternating current (DC-to-AC) converters, and hence, results in higher components count, which further results in a low level of integration.

Thereafter, different methods have been proposed for integrating the conventional OBC and the conventional WC by use of a conventional AC-to-DC converter with or without switches. In a conventional method of connection at the AC-to-DC converter with switches, the AC-to-DC (e.g., a diode bridge) stage is common for both the conventional WC and the conventional OBC systems. In this method, relays and connectors are used to isolate the conventional OBC from the conventional WC during operation. In a conventional method of connection at the AC-to-DC converter without switches, one of the AC-to-DC stages is common to both the conventional WC and the conventional OBC systems. However, the conventional method of connection at the AC-to-DC converter without switches does not require reconfiguration switches, hence, does not offer magnetic integration of the conventional WC and the conventional OBC systems. Further after, a conventional method of magnetic integration of the conventional WC and the conventional OBC is also proposed. In the conventional method of magnetic integration, a conventional WC pad serves as the transformer of the conventional OBC system. The conventional method of magnetic integration requires additional resonant components, such as external inductance, external capacitance, and two AC switches to isolate the OBC. The conventional method of connection at the AC-to-DC converter without switches and the conventional method of magnetic integration reuse only one of the two AC-to-DC converters of the conventional OBC and hence, result in lower power ratings, lower power densities, and lower utilization factors. Thus, there exists a technical problem of inefficient integration of the conventional WC and the conventional OBC systems.

Therefore, in light of the foregoing discussion, there exists a need to overcome the aforementioned drawbacks associated with the conventional methods of integrating the conventional WC and the conventional OBC systems.

SUMMARY

The present disclosure provides an OBC device for an electric vehicle, an electric vehicle, a system and methods for wirelessly charging the electric vehicle. The present disclosure provides a solution to the existing problem of inefficient integration of a conventional WC and a conventional OBC system. An objective of the present disclosure is to provide a solution that overcomes at least partially the problems encountered in other approaches and provides an improved OBC device for an electric vehicle, an electric vehicle, a system, and methods for wirelessly charging the electric vehicle.

One or more objectives of the present disclosure are achieved by the solutions provided in the enclosed independent claims. Advantageous implementations of the present disclosure are further defined in the dependent claims.

In one aspect, the present disclosure provides an OBC device for an electric vehicle, comprising a mains input comprising a PFC converter, a mains-side DC/AC converter, a transformer having a mains-side coil, and a battery-side coil, a battery-side AC/DC converter, a battery connector and one or more bypass switches configured to galvanically connecting the mains-side converter to the battery-side converter when closed. The transformer is configured to be magnetically coupled to a transmitter (TX) pad of an external wireless power transmitter (WPT) such that power is received by the mains-side coil and the battery side coil. When the bypass switches are closed, and the transformer is magnetically coupled to a WPT, power is sent to the battery connector through both the battery-side converter and the mains-side converter.

The present disclosure provides an improved OBC device which is configured to function as the OBC device as well as a wireless charger (or a wireless charging device) for wirelessly charging the electric vehicle. The disclosed OBC device is configured to function according to the mains input as well as the external WPT at two independent frequencies. The disclosed OBC device manifests a higher power density at a significantly reduced cost. The disclosed OBC device requires no additional resonant components (e.g., inductors or capacitors) apart from the two standard resonant capacitors.

In an implementation form, the OBC device further comprises a mains-side resonant tank having a first capacitance and a first inductance, and a battery-side resonant tank having a second capacitance and a second inductance and wherein values of the first capacitance and the first inductance of the mains-side resonant tank and the second capacitance and the second inductance of the battery-side resonant tank are selected to adapt the OBC device for operation with the mains input and operation with the WPT.

By virtue of selecting the values of the first capacitance and the first inductance of the mains-side resonant tank and the second capacitance and the second inductance of the battery-side resonant tank, the performance of the operation of the OBC device is adapted according to the mains input as well as to the external WPT.

In a further implementation form, the values of the first capacitance and the first inductance of the mains-side resonant tank and the second capacitance and the second inductance of the battery-side resonant tank are selected to correspond to a first resonant frequency for operation with the mains input and a second resonant frequency for operation with the WPT.

By virtue of selecting the values of the first capacitance and the first inductance of the mains-side resonant tank and the second capacitance and the second inductance of the battery-side resonant tank, the first resonant frequency and the second resonant frequency of the OBC device can be defined for operation with the mains input and with the external WPT, respectively.

In a further implementation form, the transformer is configured to operate with the mains input at the first resonant frequency commonly in the range of 200 kilohertz (kHz)-600 kHz (or higher) and operate with the WPT at the second resonant frequency in the range of 80 kHz-90 kHz.

The transformer is configured to operate at two independent frequencies that are the first resonant frequency and the second resonant frequency, without any additional resonant components.

In a further implementation form, the mains-side resonant tank comprises a first capacitor configured to generate the first capacitance, and the battery-side resonant tank comprises a second capacitor configured to generate the second capacitance.

The use of the first capacitor to generate the first capacitance and the second capacitor to generate the second capacitance simplifies the structure of the OBC device.

In a further implementation form, the mains-side coil and the battery-side coil are arranged with an offset overlap to generate the first inductance of the mains-side resonant tank and the second inductance of the battery-side resonant tank simultaneously.

By virtue of the offset overlap between the mains-side coil and the battery-side coil, the OBC device manifests the first inductance and the second inductance; hence, the OBC device requires no additional magnetic components.

In a further implementation form, the bypass switches are direct current switches.

The use of the bypass switches as the direct current switches results in a reduced cost of the OBC device.

In a further implementation form, each of the mains-side converter and the battery-side converter comprises one of a full bridge, a half-bridge, or a diode bridge.

The use of the mains-side converter and the battery-side converter as the full-bridge, the half-bridge, and the diode bridge provides efficient conversion of power from DC domain to AC domain and vice-versa.

In another aspect, the present disclosure provides an electric vehicle comprising the OBC device and at least one battery.

The electric vehicle achieves all the advantages and effects of the OBC device of the present disclosure.

In yet another aspect, the present disclosure provides a system for wirelessly charging an electric vehicle comprising the electric vehicle and an external WPT comprising a TX pad configured to deliver wireless power to the transformer of the OBC in the electric vehicle.

The system for wirelessly charging the electric vehicle manifests all the advantages and effects of the OBC device as well as the electric vehicle of the present disclosure. The system manifests an improved power density, copper utilization, low current stress, and losses as well.

In yet another aspect, the present disclosure provides a method of charging the electric vehicle, comprising magnetically coupling the transformer to a TX pad of a WPT, such that power is received by the mains-side coil and the battery side coil and closing the one or more bypass switches to galvanically connect the mains-side converter to the battery-side converter such that power is sent to the battery connector through both the battery-side converter and the mains-side converter.

The disclosed method provides bi-directional power flow and enables the electric vehicle to manifest high power density at a reduced cost.

In yet another aspect, the present disclosure provides a method of charging the electric vehicle, comprising connecting the mains input with an external mains supply and opening the one or more bypass switches to galvanically disconnect the mains-side converter from the battery-side converter such that power is sent to the mains-side coil of the transformer.

The disclosed method provides an on-board charging of the electric vehicle.

It is to be appreciated that all the aforementioned implementation forms can be combined.

It has to be noted that all devices, elements, circuitry, units, and means described in the present disclosure could be implemented in the software or hardware elements or any kind of combination thereof. All steps which are performed by the various entities described in the present disclosure, as well as the functionalities described to be performed by the various entities, are intended to mean that the respective entity is adapted to or configured to perform the respective steps and functionalities. Even if, in the following description of the embodiments, a functionality or step to be performed by external entities is not reflected in the description of a detailed element of that entity that performs that step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
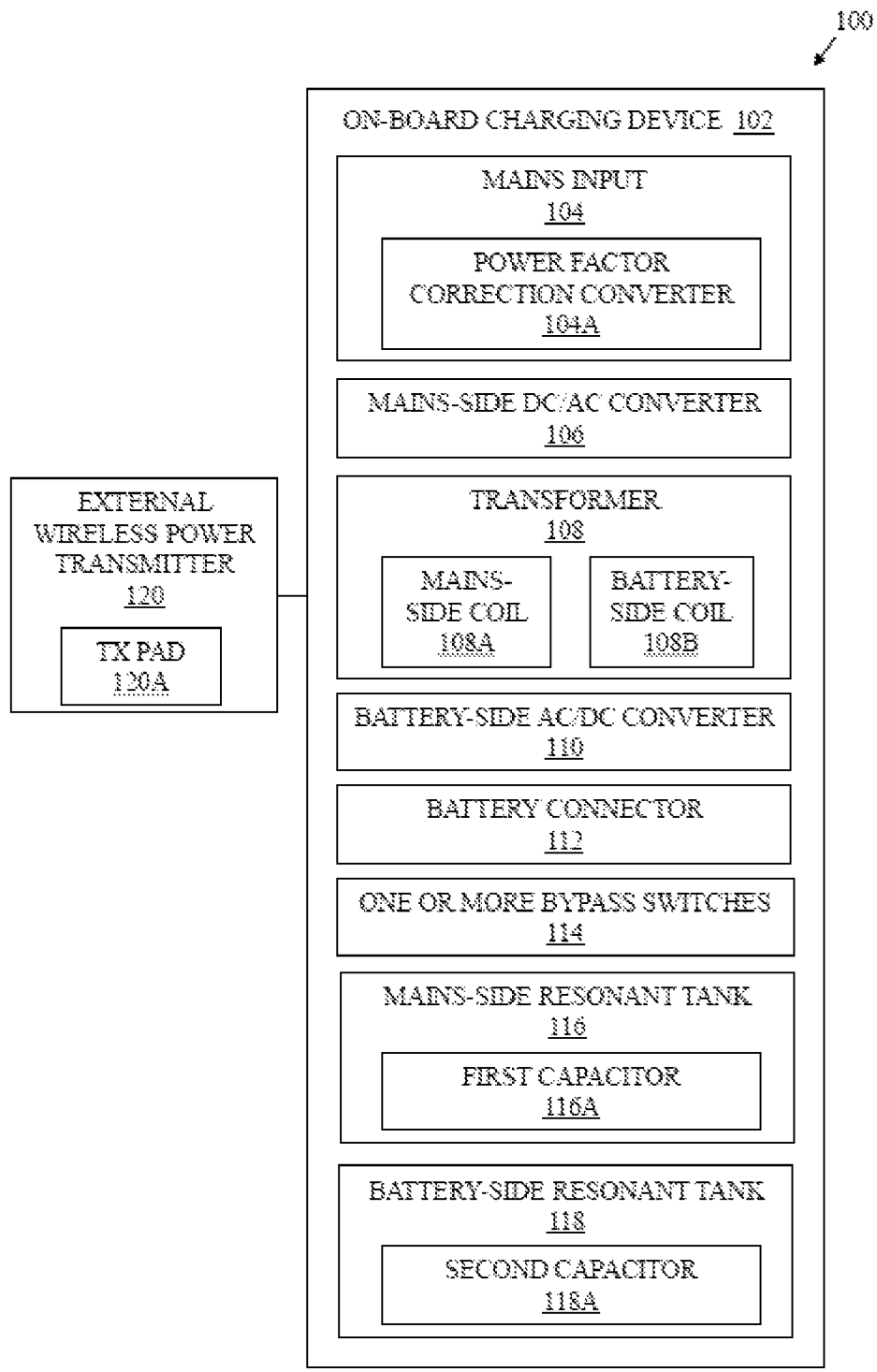
FIG. 1 is a block diagram that illustrates various exemplary components of an OBC device for an electric vehicle, in accordance with an example of the present disclosure.

FIG. 1 is a block diagram that illustrates various exemplary components of an OBC device for an electric vehicle, in accordance with an embodiment of the present disclosure. With reference to FIG. 1, there is shown a block diagram 100 of an OBC device 102 that includes a mains input 104, a mains-side DC-to-AC converter 106, a transformer 108, a battery-side AC-to-DC converter 110, a battery connector 112, one or more bypass switches 114, a mains-side resonant tank 116 and a battery-side resonant tank 118. There is further shown an external WPT 120 that includes a TX pad 120A. The mains input 104 includes a power factor correction (PFC) converter 104A. The transformer 108 includes a mains-side coil 108A and a battery-side coil 108B. The main-side resonant tank 116 includes a first capacitor 116A, and the battery-side resonant tank 118 includes a second capacitor 118A.

An on-board charging, OBC, device 102 for an electric vehicle, comprising a mains input 104 comprising a PFC converter 104A; a mains-side DC/AC converter 106; a transformer 108 having a mains-side coil 108A and a battery-side coil 108B; a battery-side AC/DC converter 110; a battery connector 112; and one or more bypass switches 114 configured to galvanically connect the mains-side converter (i.e., the mains-side DC-to-AC converter 106) to the battery-side converter (i.e., the battery-side AC-to-DC converter 110) when closed; wherein the transformer 108 is configured to be magnetically coupled to a TX pad 120A of an external WPT 120 such that power is received by the mains-side coil 108A and the battery-side coil 108B; and wherein when the bypass switches 114 are closed and the transformer 108 is magnetically coupled to a WPT 120, power is sent to the battery connector 112 through both the battery-side converter (i.e., the battery-side AC-to-DC converter 110) and the mains-side converter (i.e., the mains-side DC-to-AC converter 106).

The OBC device 102 includes suitable logic, circuitry, interfaces, or code that is configured for use in an electric vehicle for charging a battery through the battery connector 112. The OBC device 102 is configured to operate with the mains input 104 as well as with the external WPT (or simply WPT) 120. When the one or more bypass switches 114 are open, the OBC device 102 is configured to operate with the mains input 104 and charge the battery through the battery connector 112 depending on the mains input 104. When the one or more bypass switches 114 are closed, the OBC device 102 is configured to operate with the WPT 120 and charge the battery through the battery connector 112 depending on power received from the WPT 120. The operation of the OBC device 102 with the mains input 104 as well as the WPT 120 is described in more detail, for example, in FIG. 4.

The mains input 104 includes suitable logic, circuitry, interfaces, or code that is configured to provide direct current (DC) power in output. The mains input 104 may be a grid.

The PFC converter 104A includes suitable logic, circuitry, interfaces, or code that is configured to regulate the power factor of the DC power provided by the mains input 104. Generally, a PFC converter is used to make the power factor of the DC power closer to 1. Alternatively stated, the PFC converter is used to bring the power factor angle (or phase angle) of the DC power closer to 0° in order to reduce phase difference between the voltage and current so that maximum power can be drawn from the mains input 104. Examples of the PFC converter 104A includes but are not limited to a PFC boost converter, an active PFC converter, and the like.

The mains-side DC-to-AC converter 106 includes suitable logic, circuitry, interfaces, or code that is configured to convert the DC power into an AC power.

The transformer 108 includes suitable logic, circuitry, interfaces, or code that is configured to be magnetically coupled to the TX pad 120A of the external WPT 120 such that the power is received by the mains-side coil 108A and the battery-side coil 108B.

The battery-side AC-to-DC converter 110 includes suitable logic, circuitry, interfaces, or code that is configured to convert the AC power into DC power.

The battery connector 112 includes suitable logic, circuitry, interfaces, or code that is configured to provide the DC power to the battery.

The one or more bypass switches 114 includes suitable logic, circuitry, interfaces, or code that is configured to galvanically connect the mains-side converter (i.e., the mains-side DC-to-AC converter 106) to the battery-side converter (i.e., the battery-side AC-to-DC converter 110) when closed. Each of the one or more bypass switches 114 may be a DC switch. The structural and functional connections between various components of the OBC device 102 are described in more detail, for example, in FIG. 6.

In operation, when the bypass switches 114 are closed and the transformer 108 is magnetically coupled to a WPT 120, power is sent to the battery connector 112 through both the battery-side converter (i.e., the battery-side AC-to-DC converter 110) and the mains-side converter (i.e., the mains-side DC-to-AC converter 106). When the one or more bypass switches 114 are closed and the transformer 108 is magnetically coupled to the TX pad 120A of the WPT 120, the OBC device 102 is configured to operate as a wireless charger (WC). In this configuration, the transformer 108 is configured to operate as a receiver (RX) pad of the WC. The mains-side coil 108A and the battery-side coil 108B operate in parallel and feed their energy to their respective power converters, such as the mains-side coil 108A feeds the energy to the mains-side DC-to-AC converter 106 and the battery-side coil 108B feeds the energy to the battery-side AC-to-DC converter 110. In such configuration, both the converters that are the mains-side DC-to-AC converter 106 and the battery-side AC-to-DC converter 110, are used simultaneously and resulting in an improved power rating. The WC is configured for wireless charging of the battery, which may be used in an electric vehicle.

In accordance with an embodiment, the OBC device 102 further comprises the mains-side resonant tank 116 having a first capacitance and a first inductance, and the battery-side resonant tank 118 having a second capacitance and a second inductance and wherein values of the first capacitance and the first inductance of the mains-side resonant tank 116 and the second capacitance and the second inductance of the battery-side resonant tank 118 are selected to adapt the OBC device 102 for operation with the mains input 104 and operation with the WPT 120. The mains-side resonant tank 116 and the battery-side resonant tank 118 together act as a CLLC resonant tank. The CLLC resonant tank refers to a capacitor (C)-inductor (L)-inductor (L)-capacitor (C) resonant tank. The first inductance of the mains-side resonant tank 116 and the second inductance of the battery-side resonant tank 118 act as leakage inductances of the CLLC resonant tank. The first capacitance of the mains-side resonant tank 116 and the second capacitance of the battery-side resonant tank 118 are described in detail, for example, in FIG. 4.

In accordance with an embodiment, the values of the first capacitance and the first inductance of the mains-side resonant tank 116 and the second capacitance and the second inductance of the battery-side resonant tank 118 are selected to correspond to a first resonant frequency for operation with the mains input 104 and a second resonant frequency for operation with the WPT 120. The values of the first capacitance and the first inductance of the mains-side resonant tank 116 and the second capacitance and the second inductance of the battery-side resonant tank 118 are selected in order to define the first resonant frequency of the CLLC resonant tank (i.e., the combination of the mains-side resonant tank 116 and the battery-side resonant tank 118) for operation with the mains input 104 as well as the second resonant frequency for operation with the WPT 120.

In accordance with an embodiment, the transformer 108 is configured to operate with the mains input 104 at the first resonant frequency usually in the range of 200-600 kHz (higher frequencies are also possible) and operate with the WPT 120 at the second resonant frequency in the range of 80-90 kHz. In a case when the one or more bypass switches 114 are open, the transformer 108 is configured to operate with the mains input 104 at the first resonant frequency usually in the range of 200-600 kHz. The first resonant frequency higher than the range of 200-600 kHz may also be used. Alternatively stated, when the one or more bypass switches 114 are open, the OBC device 102 is configured to operate according to the mains input 104 at the first resonant frequency. In another case, when the one or more bypass switches 114 are closed, the transformer 108 is configured to operate with the WPT 120 at the second resonant frequency in the range of 80-90 kHz. Alternatively stated, when the one or more bypass switches 114 are closed, the OBC device 102 is configured to operate with the WPT 120 at the second resonant frequency in the range of 80-90 kHz.

In accordance with an embodiment, the mains-side resonant tank 116 comprises a first capacitor 116A configured to generate the first capacitance, and the battery-side resonant tank 118 comprises a second capacitor 118A configured to generate the second capacitance. The mains-side resonant tank 116 comprises the first capacitor 116A that is configured to generate the first capacitance. Similarly, the battery-side resonant tank 118 comprises the second capacitor 118A that is configured to generate the second capacitance. This is described in more detail, for example, in FIG. 4.

In accordance with an embodiment, the mains-side coil 108A and the battery-side coil 108B are arranged with an offset overlap to generate the first inductance of the mains-side resonant tank 116 and the second inductance of the battery-side resonant tank 118 simultaneously. The mains-side coil 108A and the battery-side coil 108B of the transformer 108 are arranged with the offset (i.e., a partial) overlap to generate the first inductance of the mains-side resonant tank 116 and the second inductance of the battery-side resonant tank 118, simultaneously. The mains-side coil 108A and the battery-side coil 108B are configured to have a partial overlap (i.e., the offset overlap) which induces a large mutual inductance as well as a small leakage inductance. The partial overlap between the mains-side coil 108A and the battery-side coil 108B may be obtained in various ways. For example, in one configuration, the mains-side coil 108A and the battery-side coil 108B may be displaced from their center points, or in a second configuration, the mains-side coil 108A and the battery-side coil 108B may be stretched sideways to create the partial overlap, or in a third configuration, the mains-side coil 108A and the battery-side coil 108B may be stretched in different axes to create the partial overlap. All such configurations are described in detail, for example, in FIGS. 11A, 12A, and 13A.

In accordance with an embodiment, the bypass switches (i.e., the one or more bypass switches 114) are direct current switches. The one or more bypass switches 114 are direct current (DC) switches that are configured to regulate the operation of the OBC device 102 with the mains input 104 as well as with the WPT 120.

In accordance with an embodiment, each of the mains-side converter (i.e., the mains-side DC-to-AC converter 106) and the battery-side converter (i.e., the battery-side AC-to-DC converter 110) comprises one of a full bridge, a half-bridge, or a diode bridge. Each of the mains-side DC-to-AC converter 106 and the battery-side AC-to-DC converter 110 may be one of an active full-bridge converter or a half-bridge converter. In a case, if bi-directional power flow is not required, then, in that case, the battery-side AC-to-DC converter 110 may be a passive converter, such as a diode bridge.

Thus, the OBC device 102 is configured to function as the on-board charging device as well as wireless charging device for the battery. When the one or more bypass switches 114 are open, then the OBC device 102 is configured to function as the on-board charging device for the battery. When the one or more bypass switches 114 are closed, then, the OBC device 102 is configured to function as the wireless charging device for the battery. In this way, the OBC device may function as the on-board charging device as well as the wireless charging device for the battery resulting into higher power density with a significant cost reduction.

Figure 2:
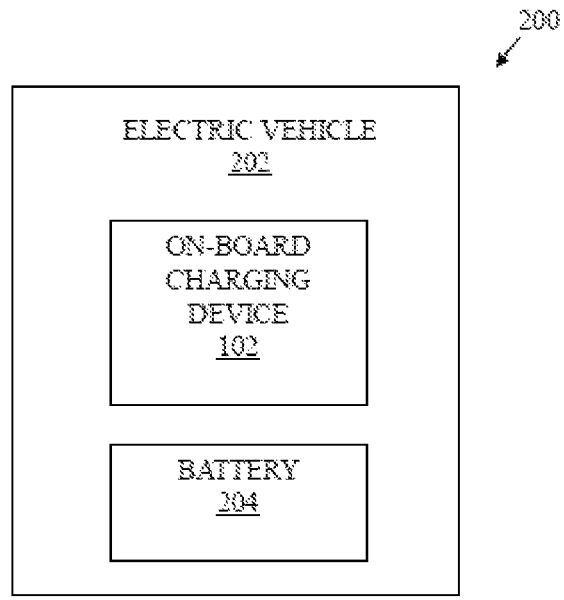
FIG. 2 is a block diagram that illustrates various exemplary components of an electric vehicle, in accordance with an example of the present disclosure.

FIG. 2 is a block diagram that illustrates various exemplary components of an electric vehicle, in accordance with an embodiment of the present disclosure. FIG. 2 is described in conjunction with elements from FIG. 1. With reference to FIG. 2, there is shown a block diagram 200 of an electric vehicle 202 that includes the on-board charging (OBC) device 102 (of FIG. 1) and a battery 204.

The electric vehicle 202 includes suitable logic, circuitry, interfaces, or code that is configured either partially or fully powered by use of the battery 204. As the electric vehicle 202 includes the OBC device 102, therefore, the electric vehicle 202 manifests on-board charging as well as wireless charging of the battery 204. The electric vehicle 202 manifests an improved power rating as well as reduced cost. Examples of the electric vehicle 202 include, but are not limited to, a battery-electric vehicle, a plugin hybrid electric vehicle, a hybrid electric vehicle, and the like.

Figure 3:
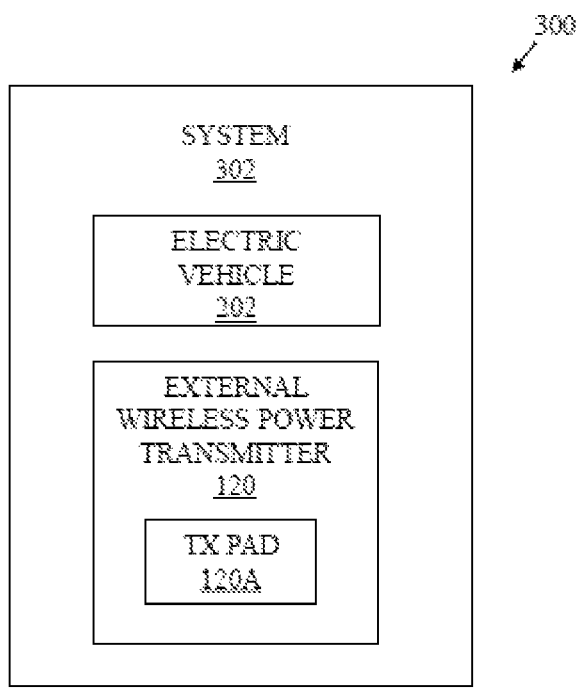
FIG. 3 is a block diagram that illustrates various exemplary components of a system for wirelessly charging an electric vehicle, in accordance with an example of the present disclosure.

FIG. 3 is a block diagram that illustrates various exemplary components of a system for wirelessly charging an electric vehicle, in accordance with an embodiment of the present disclosure. FIG. 3 is described in conjunction with elements from FIGS. 1 and 2. With reference to FIG. 3, there is shown a block diagram 300 of a system 302 that includes the electric vehicle 202 (of FIG. 2) and the external WPT 120 (of FIG. 1). The external WPT 120 includes the TX pad 120A.

The system 302 is configured for wirelessly charging an electric vehicle, such as the electric vehicle 202 (of FIG. 2). In a case, the system 302 is configured to function as the OBC device 102 for charging the battery 204 of the electric vehicle 202. In this case, the system 302 is configured to operate depending on a mains input, such as the mains input 104.

In another case, the system 302 is configured to function as a wireless charger (WC) for charging the battery 204 of the electric vehicle 202. In this case, the system 302 is configured to operate depending on an external power source, for this, the external WPT 120 including with the TX pad 120A that is configured to deliver wireless power to the transformer 108 of the OBC device 102 in the electric vehicle 202. In this case, the OBC device 102 functions as the WC.

In an implementation form, the WPT 120 is configured to operate at resonant frequency in the range of 80-90 kHz. In a case, when the system 302 is configured to operate as the WC, the WPT 120 is configured to operate at the resonant frequency in the range of 80-90 kHz.

In this way, the system 302 is configured to adapt the operation of the OBC device 102 and the WC at two independent frequencies without having to add or remove resonant components (e.g., inductors or capacitors). Thus, the system 302 provides a higher power density with a significantly reduced cost.

Figure 4:
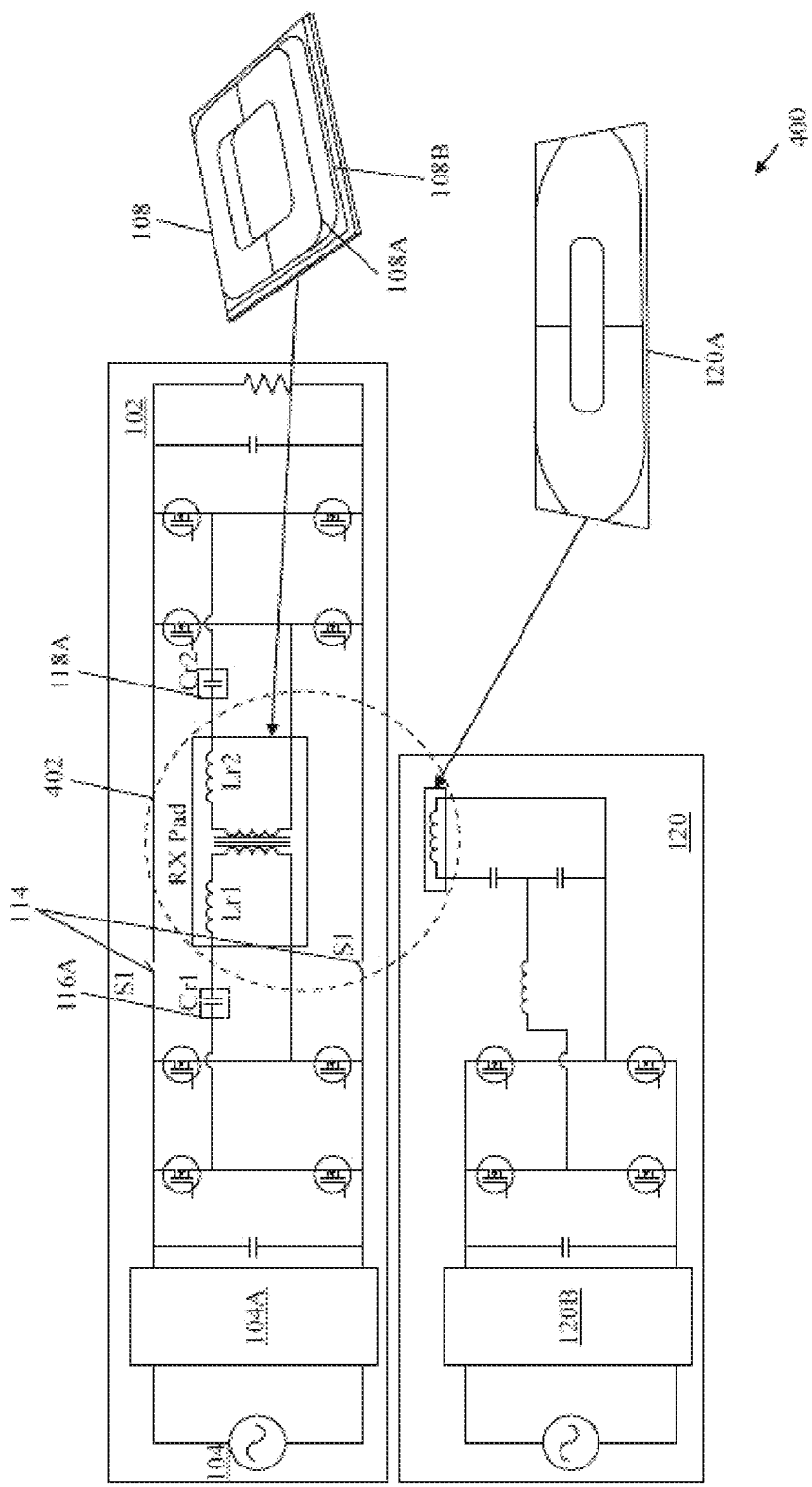
FIG. 4 is a circuit diagram of a system that depicts the operation of an OBC device with a mains input and a WPT, in accordance with an example of the present disclosure.

FIG. 4 is a circuit diagram of a system that depicts the operation of an on-board charging (OBC) device with a mains input and an external WPT, in accordance with an embodiment of the present disclosure. FIG. 4 is described in conjunction with elements from FIGS. 1, 2, and 3. With reference to FIG. 4, there is shown a system 400 that depicts the operation of an OBC device, such as the OBC device 102 (of FIG. 1) with the mains input 104 as well as with the external WPT 120.

The external WPT 120 includes a power factor correction (PFC) converter 120B that corresponds to the PFC converter 104A of the OBC device 102.

In a case, the OBC device 102 is configured to operate with the mains input 104 when the one or more bypass switches 114 (also represented as S1) are open. In another case, the OBC device 102 is configured to operate with the external WPT 120 when the one or more bypass switches 114 (i.e., S1) are closed. In the other case, the OBC device 102 may operate as a wireless charger (WC) which may be configured for wirelessly charging the battery 204 of the electric vehicle 202 (of FIG. 2). In the other case, the transformer 108 of the OBC device 102 is configured to operate as a RX pad of the WC which is configured to receive wireless power from the TX pad 120A of the external WPT 120. In this case, the RX pad of the WC and the TX pad 120A of the external WPT 120 are magnetically coupled and this magnetic coupling is represented by a dotted circle 402. Therefore, in a case when the one or more bypass switches 114 (i.e., S1) are closed, and the RX pad of the WC is magnetically coupled to the TX pad 120A of the external WPT 120, the OBC device 102 operates as the WC. Due to the magnetic coupling between the TX pad 120A of the external WPT 120 and the RX pad of the WC, magnetic inductance comes into play. In this case, the mains-side coil 108A and the battery-side coil 108B of the RX pad (i.e., the transformer 108) of the WC are configured to operate in parallel, feeding the energy to their respective power converters. That means the mains-side coil 108A is configured to feed the energy to the mains-side DC-to-AC converter 106, and the battery-side coil 108B is configured to feed the energy to the battery-side AC-to-DC converter 110. In this case, both the converters that are the mains-side DC-to-AC converter 106 and the battery-side AC-to-DC converter 110, are simultaneously used, resulting in an improved power rating, for example, twice that of the OBC device 102. The mains-side coil 108A and the battery-side coil 108B of the RX pad (i.e., the transformer 108) of the WC are galvanically isolated. In comparison to conventional methods, each of the mains-side coil 108A and the battery-side coil 108B is simultaneously used to transmit power to the battery 204 when the OBC device 102 operates as the WC. This way, each of the mains-side DC-to-AC converter 106 and the battery-side AC-to-DC converter 110, and each of the mains-side coil 108A and the battery-side coil 108B is simultaneously used that result in higher power ratings and utilization factors. Moreover, the current and the power get split into the two converters (i.e., the mains-side coil 108A and the battery-side coil 108B) and the two coils (i.e., the mains-side coil 108A and the battery-side coil 108B), hence, an improved copper utilization, lower current stress, and losses are attained.

In the case, when the OBC device 102 is configured to operate with the mains input 104, the RX pad of the WC is configured to serve as the transformer 108 (e.g., an isolation transformer) of the OBC device 102. The OBC device 102 includes the CLLC resonant tank induced by the mains-side resonant tank 116 and the battery-side resonant tank 118. The mains-side resonant tank 116 includes the first capacitor 116A (also represented as Cr1) that is configured to generate the first capacitance. Moreover, the mains-side resonant tank 116 includes the first inductance (also represented as Lr1). Similarly, the battery-side resonant tank 118 includes the second capacitor 118A (also represented as Cr2) that is configured to generate the second capacitance. Moreover, the battery-side resonant tank 118 includes the second inductance (also represented as Lr2). The first inductance (i.e., Lr1) and the second inductance (i.e., Lr2) may act as the leakage inductances of the CLLC resonant tank. Therefore, no additional magnetic components are required in comparison to conventional methods in which more inductors and capacitors are required. Additionally, the ratio between the leakage inductance and the magnetizing inductance can be controlled by regulating the offset overlap between the two coils (i.e., the mains-side coil 108A and the battery-side coil 108B) forming the transformer 108 of the OBC device 102.

The operation of the OBC device 102 with the mains input 104 as well as the WPT 120 allows a bi-directional power flow. Furthermore, the system 400 adapts the operation of the OBC device 102 and the WC at two independent frequencies without having to add or remove resonant components (i.e., inductors or capacitors). In comparison to the conventional approach, the system 400 provides higher power densities and cost reduction as well. The power density is increased due to removal of a conventional OBC transformer and resonant tank inductors, removal of AC-to-DC converter of a conventional WC system, and increase in power rating when the OBC device 102 is used as the WC. The cost of the system 400 is reduced due to removal of the conventional OBC transformer and additional resonant tank inductors, removal of the AC-to-DC converter of the conventional WC system, and integration of the system 400 into one single printed circuit board (PCB) with share housing and cooling system. Further, shared controller and gate drives circuits also reduce the cost of the system 400.

Figure 5A:
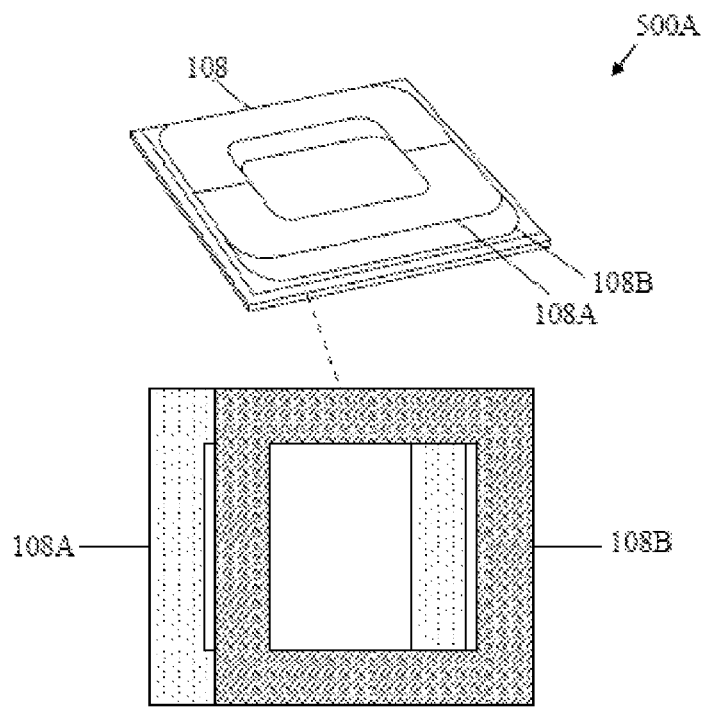
FIG. 5A is a schematic diagram that depicts coil structure of a transformer of an OBC device, in accordance with an example of the present disclosure.

FIG. 5A is a schematic diagram that depicts coil structure of a transformer of an OBC device, in accordance with an embodiment of the present disclosure. FIG. 5A is described in conjunction with elements from FIGS. 1 and 4. With reference to FIG. 5A, there is shown a coil structure 500A of the transformer 108 of the OBC device 102 (of FIG. 1). The transformer 108 includes the mains-side coil 108A and the battery-side coil 108B.

Each of the mains-side coil 108A and the battery-side coil 108B is displaced from its center point to induce a partial overlap between the two. The partial overlap between the mains-side coil 108A and the battery-side coil 108B introduces a large mutual inductance and a small leakage inductance in the CLLC resonant tank. Conventionally, the coils of a WC system are designed to have either a zero overlap or a large overlap to cancel the mutual inductance. In contrast to the conventional coils, the mains-side coil 108A and the battery-side coil 108B introduces a large mutual inductance (i.e., magnetizing inductance) and a small leakage inductance in the CLLC resonant tank. Therefore, no additional magnetic components are required in comparison to conventional methods in which more inductors and capacitors are required. Additionally, the ratio between the leakage inductance and the magnetizing inductance can be controlled by regulating the partial overlap between the two coils (i.e., the mains-side coil 108A and the battery-side coil 108B) forming the transformer 108 of the OBC device 102. A different arrangement of the mains-side coil 108A and the battery-side coil 108B allows the integration of the leakage as well as a magnetizing inductance in the RX pad of the WC and described in detail, for example, in FIGS. 11A, 12A, and 13A. The mains-side coil 108A and the battery-side coil 108B of the transformer 108 may also be referred to as the mains-side coil 108A and the battery-side coil 108B of the RX pad of the WC when the OBC device 102 is configured to operate with the external WPT 120.

Figure 5B:
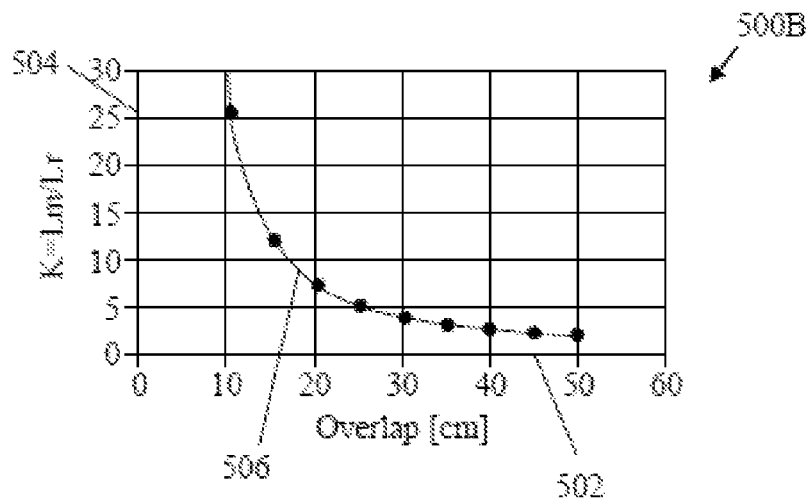
FIG. 5B is a graphical representation that illustrates variation of a ratio between leakage and magnetizing inductances with an increase in overlap between the two coils of the transformer of the OBC device, in accordance with an example of the present disclosure.

FIG. 5B is a graphical representation that illustrates variation of a ratio between leakage and magnetizing inductances with an increase in overlap between the two coils of the transformer of the OBC device, in accordance with an embodiment of the present disclosure. FIG. 5B is described in conjunction with elements from FIGS. 1, 4, and 5A. With reference to FIG. 5B, there is shown a graphical representation 500B that depicts a variation of a ratio between leakage and magnetizing inductances with an increase in overlap between the two coils (i.e., the mains-side coil 108A and the battery-side coil 108B) of the transformer 108 of the OBC device 102.

The graphical representation 500B includes an X-axis 502 that depicts an overlap in centimeters (cm) between the mains-side coil 108A and the battery-side coil 108B of the transformer 108 of the OBC device 102. The graphical representation 500B further includes a Y-axis 504 that depicts a ratio (k=Lm/Lr) between the leakage inductance (Lr) and magnetizing inductance (Lm) induced by the overlap between the mains-side coil 108A and the battery-side coil 108B of the transformer 108 of the OBC device 102. In the graphical representation 500B, a first line 506 represents the variation of the ratio (k=Lm/Lr) between leakage and magnetizing inductances with an increase in overlap between the mains-side coil 108A and the battery-side coil 108B of the transformer 108 of the OBC device 102. The first line 506 signifies that as the overlap between the mains-side coil 108A and the battery-side coil 108B increases, the ratio between leakage and magnetizing inductances decreases.

Figure 6:
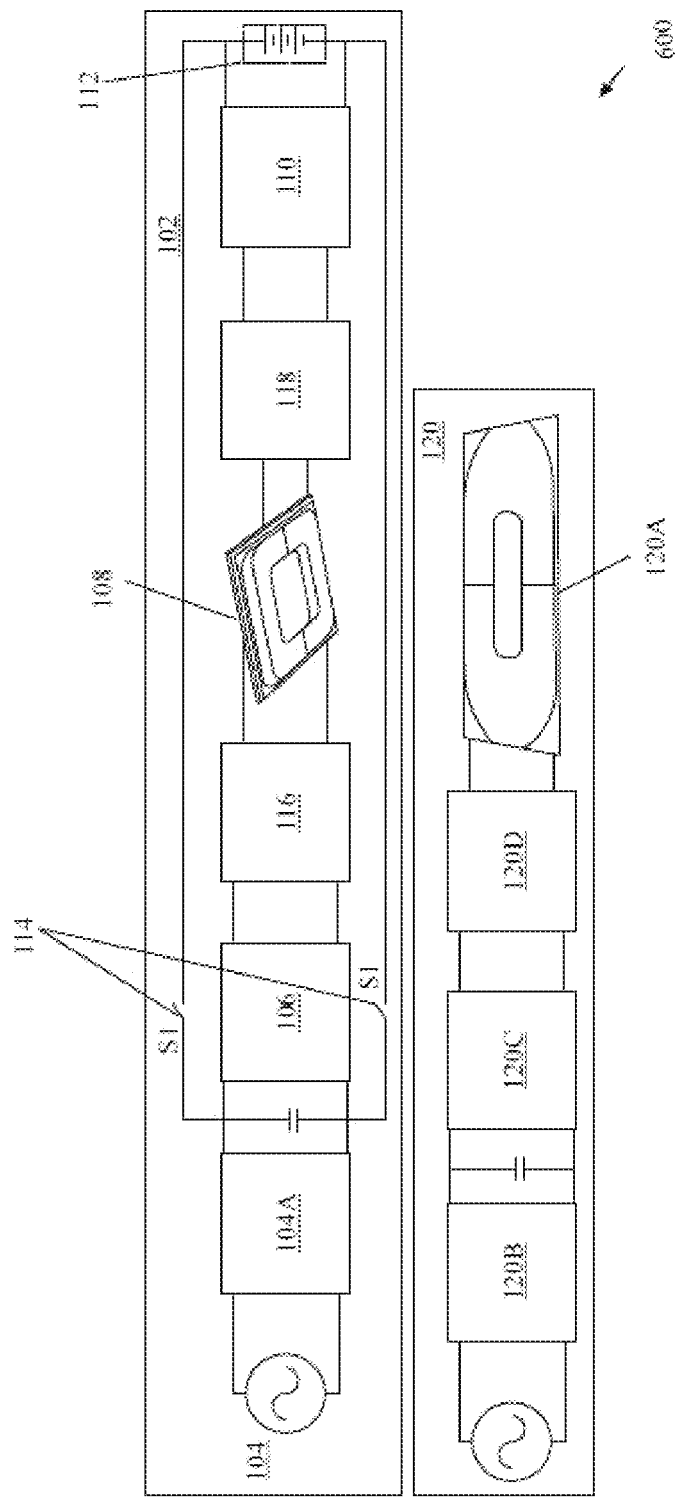
FIG. 6 is a block diagram that illustrates various exemplary components of a system for wirelessly charging an electric vehicle, in accordance with an example of the present disclosure.

FIG. 6 is a block diagram that illustrates various exemplary components of a system for wirelessly charging an electric vehicle, in accordance with an embodiment of the present disclosure. FIG. 6 is described in conjunction with elements from FIGS. 1, 2, 3, 4, and 5A. With reference to FIG. 6, there is shown a block diagram of a system 600 for wirelessly charging an electric vehicle, such as the electric vehicle 202 (of FIG. 2).

The system 600 corresponds to the system 302 (of FIG. 3) and the system 400 (of FIG. 4). The system 600 is configured to function as the OBC device 102 for charging the battery 204 of the electric vehicle 202. Additionally, the system 600 is configured to function as a wireless charger (WC) for charging the battery 204 of the electric vehicle 202. In this way, the system 600 is arranged to allow two operating modes (i.e., the OBC device 102 and the WC) and to allow for the use of both AC-to-DC converters when operating as the WC. Furthermore, in addition to the TX pad 120A, the external WPT 120 includes a PFC converter 120B, a DC-to-AC converter 120C, and a resonant tank 120D. Each of the PFC converter 120B, the DC-to-AC converter 120C, and the resonant tank 120D of the external WPT 120 corresponds to the PFC converter 104A, the mains-side DC-to-AC converter 106 and the mains-side resonant tank 116 of the OBC device 102, respectively.

When the one or more bypass switches 114 (i.e., S1) are open and the system 600 is configured to function as the OBC device 102, the mains input 104 is used. The mains input 104 may be a power grid to supply the power to the PFC converter 104A. The PFC converter 104A is used to regulate the power factor of the power supplied by the mains input 104. After regulating the power factor, the power is converted from DC domain to AC domain by use of the mains-side DC-to-AC converter 106. The mains-side DC-to-AC converter 106 is also configured to excite the power with higher frequency currents. Similarly, the battery-side AC-to-DC converter 110 is used for conversion of the power from the AC domain to the DC domain. Each of the mains-side DC-to-AC converter 106 and the battery-side AC-to-DC converter 110 is an active full-bridge converter (or rectifier). However, a half-bridge rectifier may also be used as the mains-side DC-to-AC converter 106 and the battery-side AC-to-DC converter 110. If bi-directional power flow is not required, then, the battery-side AC-to-DC converter 110 may be a diode bridge. Furthermore, between the transformer 108 and the mains-side DC-to-AC converter 106, the mains-side resonant tank 116 is placed. In order to maintain symmetry in the system 600, between the transformer 108 and the battery side AC-to-DC converter 110, the battery-side resonant tank 118 is placed. The mains-side resonant tank 116 and the battery-side resonant tank 118 are configured to define a first resonant frequency of the OBC device 102 usually in the range of 200-600 kHz. The first resonant frequency higher than the range of 200-600 kHz may also be used. In order to define the first resonant frequency of the OBC device 102, the values of the first capacitance and the first inductance of the mains-side resonant tank 116 and the second capacitance and the second inductance of the battery-side resonant tank 118 are adjusted accordingly. The first capacitance of the mains-side resonant tank 116 is adjusted by use of the first capacitor 116A (i.e., Cr1), and the second capacitance of the battery-side resonant tank 118 is adjusted by use of the second capacitor 118A (i.e., Cr2). The use of the first capacitor 116A and the second capacitor 118A simplifies the structure of the system 600. Moreover, the first inductance (i.e., Lr1) of the mains-side resonant tank 116 and the second inductance (i.e., Lr2) of the battery-side resonant tank 118 is adjusted by regulating the overlap between the mains-side coil 108A and the battery-side coil 108B of the transformer 108. The power converted to the DC domain by use of the battery-side AC-to-DC converter 110 is provided to the battery 204 through the battery connector 112. In this way, the system 600 is configured to operate as the OBC device 102 when the one or more bypass switches 114 (i.e., S1) are open.

When the one or more bypass switches 114 (i.e., S1) are closed and the system 600 is configured to function as the WC, hence, the external WPT 120 is used. In this case, the transformer 108 of the OBC device 102 is configured to operate as the RX pad of the WC. The TX pad 120A of the external WPT 120 is magnetically coupled to the RX pad of the WC. The external WPT 120 including the TX pad 120A is configured to deliver wireless power to the RX pad (i.e., the transformer 108) of the WC. The mains-side coil 108A and the battery-side coil 108B of the RX pad (i.e., transformer 108) of the WC are configured to operate in parallel, feeding the energy to their respective power converters. That means the mains-side coil 108A is configured to feed the energy to the mains-side DC-to-AC converter 106 and the battery-side coil 108B is configured to feed the energy to the battery-side AC-to-DC converter 110. In this case, both the converters that are the mains-side DC-to-AC converter 106 and the battery-side AC-to-DC converter 110, are simultaneously used resulting in a higher power rating in comparison to the OBC device 102.

Thus, the system 600 provides a higher power rating due to an increase in the power rating of the WC and a significant cost reduction due to the integration of the system 600 into one single PCB with share housing and a cooling system as well.

Figure 7:
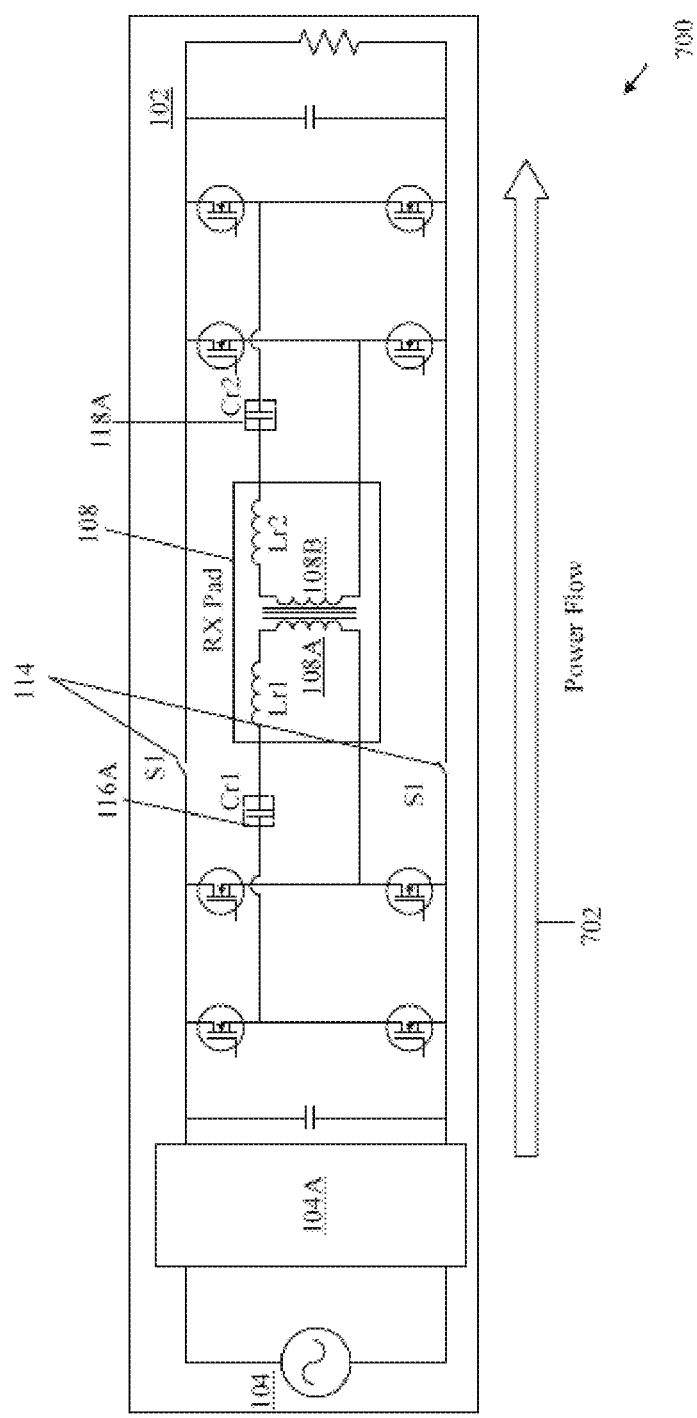
FIG. 7 is a circuit diagram of a system configured to operate as an OBC device, in accordance with an example of the present disclosure.

FIG. 7 is a circuit diagram of a system configured to operate as an OBC device, in accordance with an embodiment of the present disclosure. FIG. 7 is described in conjunction with elements from FIGS. 1, 2, 3, 4, 5A, and 6. With reference to FIG. 7, there is shown a system 700 that is configured to operate as the OBC device 102 (of FIG. 1)

When the one or more bypass switches 114 (i.e., S1) are open, the system 700 is split into two galvanically isolated sections. Therefore, the system 700 is configured to operate as the OBC device 102, whose the first resonant frequency is given by equation 1

$$f\_r1 = 1/(2??(L\_r1\ C\_r1)) = 1/(2??(L\_r2\ C\_r2)) \quad (1)$$

The first resonant frequency of the OBC device 102 can be designed to operate at frequency usually in a range of 200-600 kHz (or higher) by virtue of selecting the values of the capacitances (Crx) and the inductances (Lrx), accordingly. Alternatively stated, the first resonant frequency of the OBC device 102 can be designed depending on an application scenario by virtue of selecting the values of the first capacitance (Cr1) and the first inductance (Lr1) of the mains-side resonant tank 116 and the second capacitance (Cr2) and the second inductance (Lr2) of the battery-side resonant tank 118. There is further shown a power flow direction in the system 700 during charging a battery (e.g., the battery 204 of the electric vehicle 202) by use of an arrow 702. The arrow 702 indicates the power flow direction from the mains input 104 to the battery 204 (not shown here). However, the power flow direction can be reversed if vehicle to everything (V2X) operation is required.

Figure 8A:
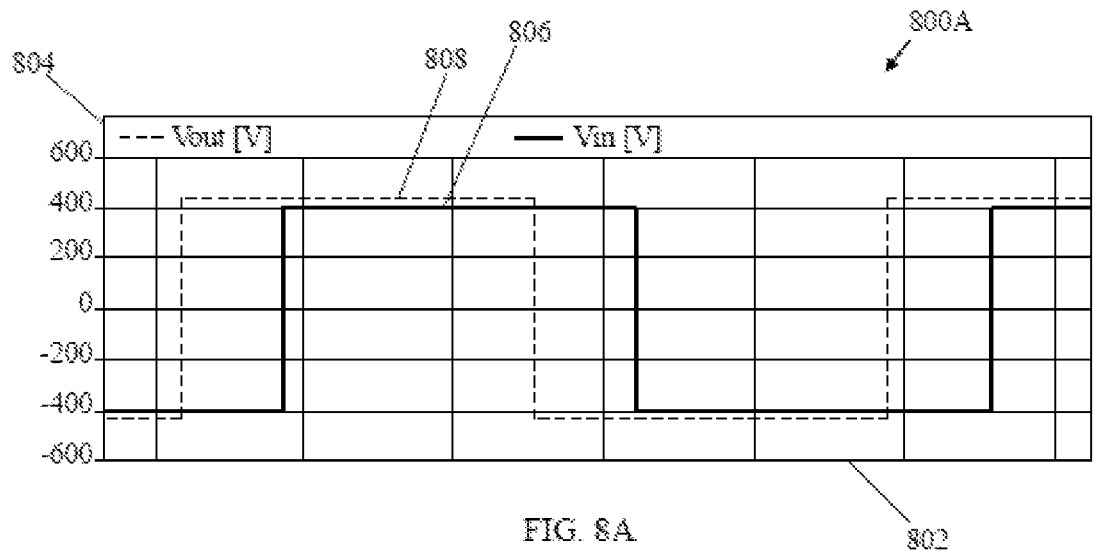
FIG. 8A is a graphical representation that illustrates voltage waveforms of an OBC device under sub-resonant frequencies, in accordance with an example of the present disclosure.

FIG. 8A is a graphical representation that illustrates voltage waveforms of an OBC device under sub-resonant frequencies, in accordance with an embodiment of the present disclosure. FIG. 8A is described in conjunction with elements from FIGS. 1, 2, 3, 4, 5A, 6, and 7. With reference to FIG. 8A, there is shown a graphical representation 800A that depicts voltage waveforms of the OBC device 102 (of FIG. 1) under sub-resonant frequencies. The system 700 (of FIG. 7) is configured to operate as the OBC device 102.

The graphical representation 800A includes an X-axis 802 that depicts time. The graphical representation 800A further includes a Y-axis 804 that depicts an amplitude of voltage waveforms of the OBC device 102. A first waveform 806 represents an input voltage waveform of the OBC device 102 under sub-resonant frequencies. Alternatively stated, the first waveform 806 represents a voltage waveform (Vcon1) of the mains-side DC-to-AC converter 106 of the OBC device 102. A second waveform 808 represents an output voltage waveform of the OBC device 102 under sub-resonant frequencies. Alternatively stated, the second waveform 808 represents a voltage waveform (Vcon2) of the battery-side AC-to-DC converter 110.

Figure 8B:
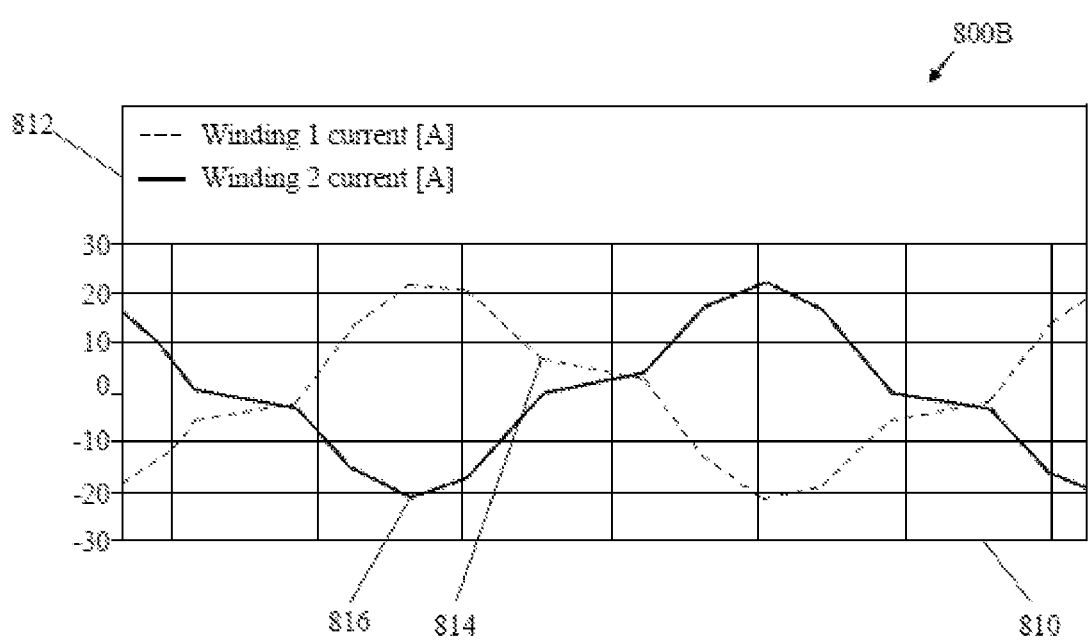
FIG. 8B is a graphical representation that illustrates current waveforms of an OBC device under sub-resonant frequencies, in accordance with an example of the present disclosure.

FIG. 8B is a graphical representation that illustrates current waveforms of an OBC device under sub-resonant frequencies, in accordance with an embodiment of the present disclosure. FIG. 8B is described in conjunction with elements from FIGS. 1, 2, 3, 4, 5A, 6, 7, and 8A. With reference to FIG. 8B, there is shown a graphical representation 800B that depicts current waveforms of the OBC device 102 (of FIG. 1) under sub-resonant frequencies. The system 700 (of FIG. 7) is configured to operate as the OBC device 102.

The graphical representation 800B includes an X-axis 810 that depicts time. The graphical representation 800B further includes a Y-axis 812 that depicts an amplitude of current waveforms of the OBC device 102. A first waveform 814 represents a current waveform (ilr1) flowing through the first inductance (lr1) of the mains-side resonant tank 116 of the OBC device 102 under sub-resonant frequencies. A second waveform 816 represents a current waveform (ilr2) flowing through the second inductance (lr2) of the battery-side resonant tank 118 of the OBC device 102 under sub-resonant frequencies.

Figure 8C:
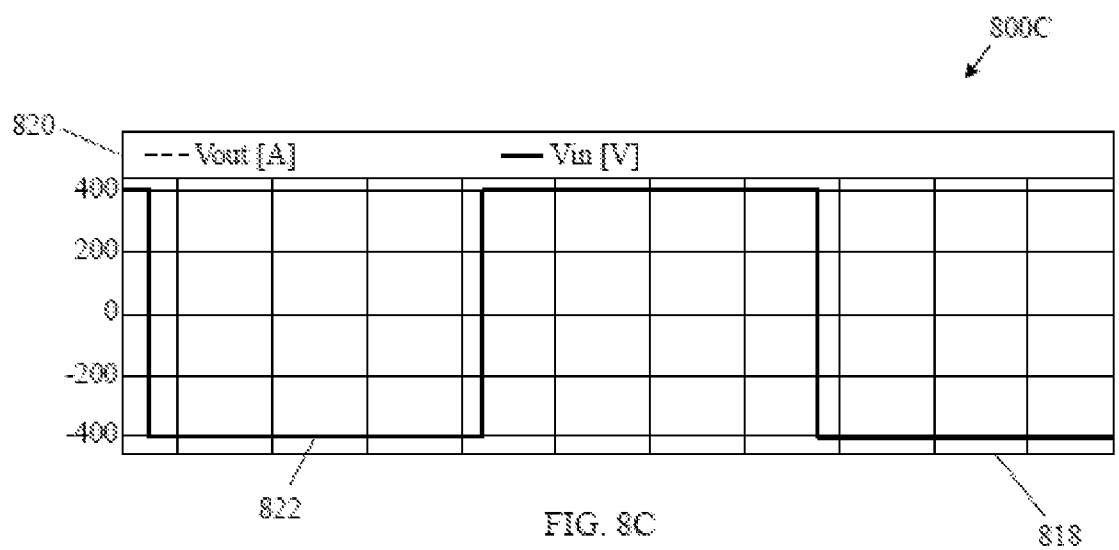
FIG. 8C is a graphical representation that illustrates voltage waveforms of an OBC device at resonant frequencies, in accordance with an example of the present disclosure.

FIG. 8C is a graphical representation that illustrates voltage waveforms of an OBC device at resonant frequencies, in accordance with an embodiment of the present disclosure. FIG. 8C is described in conjunction with elements from FIGS. 1, 2, 3, 4, 5A, 6, 7, and 8A. With reference to FIG. 8C, there is shown a graphical representation 800C that depicts voltage waveforms of the OBC device 102 (of FIG. 1) at resonant frequencies (e.g., the first resonant frequency). The system 700 (of FIG. 7) is configured to operate as the OBC device 102. The resonant frequencies (i.e., the first resonant frequency) of the OBC device 102 usually lie in the range of 200-600 kHz. The first resonant frequency higher than the range of 200-600 kHz may also be used.

The graphical representation 800C includes an X-axis 818 that depicts time. The graphical representation 800C further includes a Y-axis 820 that depicts an amplitude of voltage waveforms of the OBC device 102. A first waveform 822 represents a voltage waveform of the OBC device 102 at the resonant frequencies (i.e., the first resonant frequency). Alternatively stated, the first waveform 822 represents a voltage waveform (Vcon2) of the battery-side AC-to-DC converter 110 of the OBC device 102.

Figure 8D:
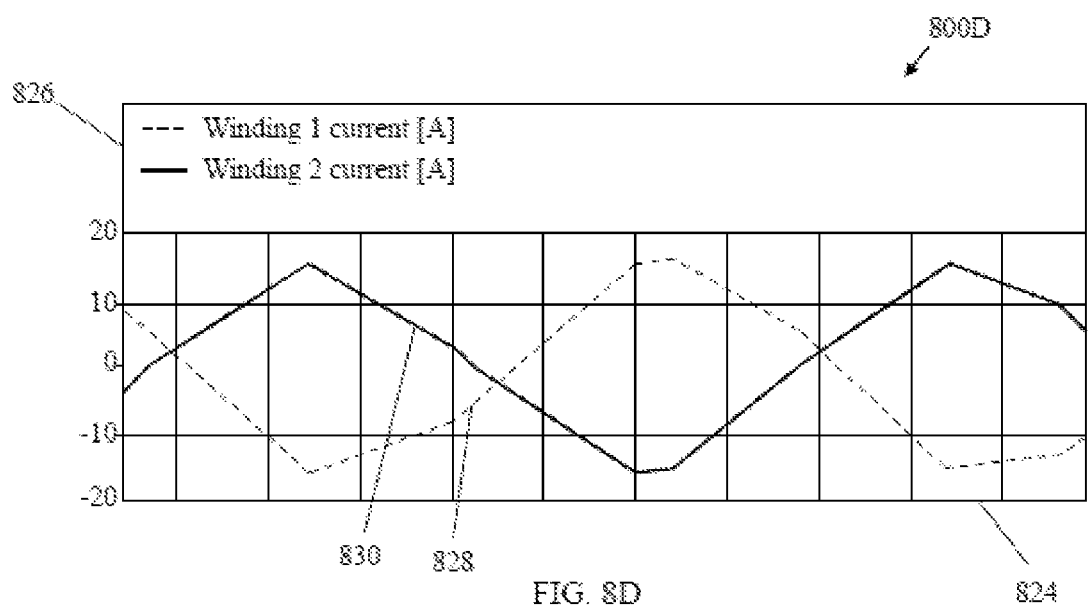
FIG. 8D is a graphical representation that illustrates current waveforms of an OBC device at resonant frequencies, in accordance with an example of the present disclosure.

FIG. 8D is a graphical representation that illustrates current waveforms of an OBC device at resonant frequencies, in accordance with an embodiment of the present disclosure. FIG. 8D is described in conjunction with elements from FIGS. 1, 2, 3, 4, 5A, 6, 7, 8B, and 8C. With reference to FIG. 8D, there is shown a graphical representation 800D that depicts current waveforms of the OBC device 102 (of FIG. 1) at resonant frequencies. The system 700 (of FIG. 7) is configured to operate as the OBC device 102.

The graphical representation 800D includes an X-axis 824 that depicts time. The graphical representation 800D further includes a Y-axis 826 that depicts an amplitude of current waveforms of the OBC device 102. A first waveform 828 represents a current waveform (ilr1) flowing through the first inductance (lr1) of the mains-side resonant tank 116 of the OBC device 102 at resonant frequencies. A second waveform 830 represents a current waveform (ilr2) flowing through the second inductance (lr2) of the battery-side resonant tank 118 of the OBC device 102 at resonant frequencies.

Figure 9:
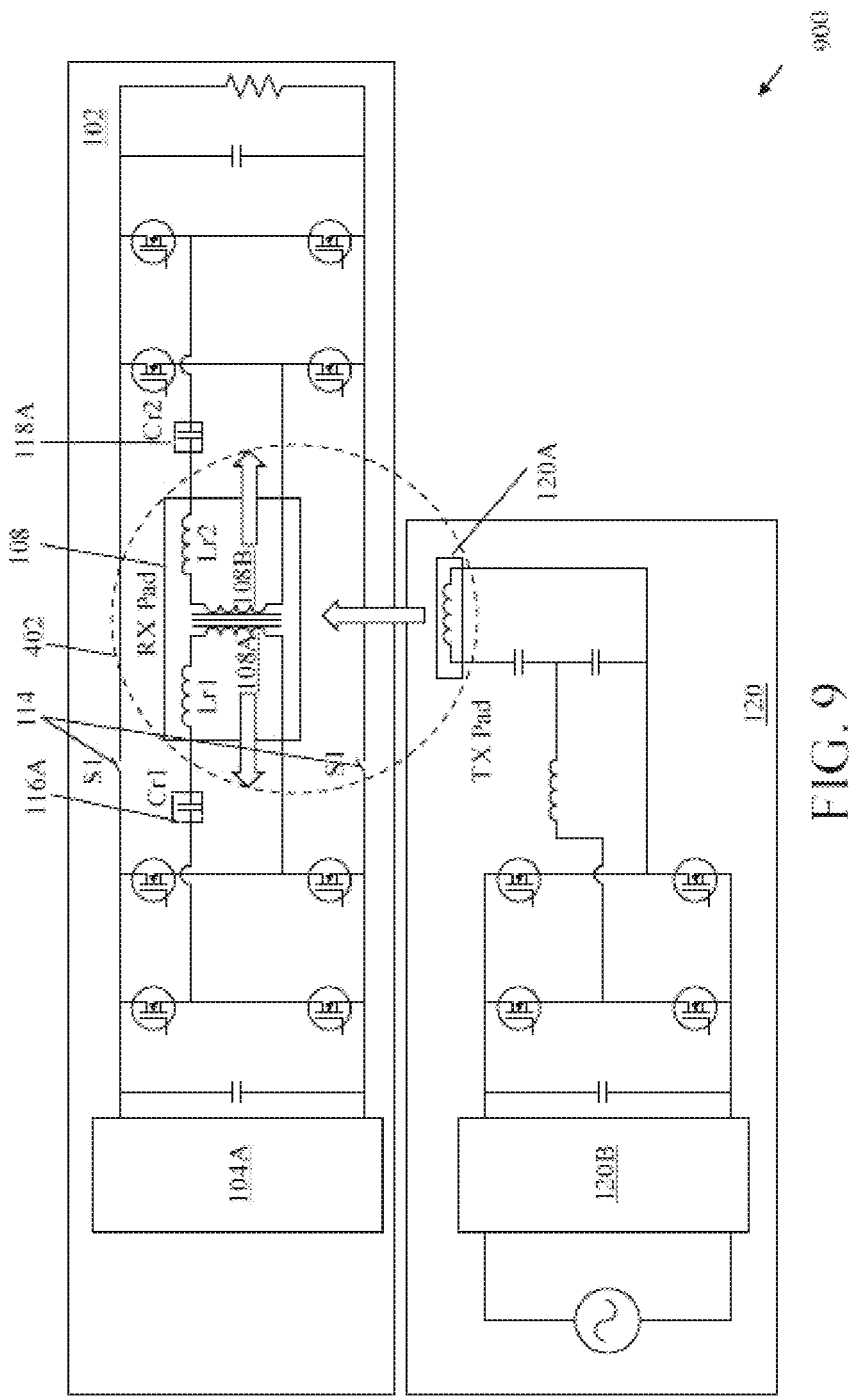
FIG. 9 is a circuit diagram of a system configured to operate as a wireless charger (WC), in accordance with an example of the present disclosure.

FIG. 9 is a circuit diagram of a system configured to operate as a wireless charger (WC), in accordance with an embodiment of the present disclosure. FIG. 9 is described in conjunction with elements from FIGS. 1, 2, 3, 4, 5A, and 6. With reference to FIG. 9, there is shown a system 900 that is configured to operate as a wireless charger.

When the one or more bypass switches 114 (i.e., S1) are closed, and the transformer 108 is magnetically coupled to the TX pad 120A of the external WPT 120, then the OBC device 102 is configured to operate as the wireless charger (WC) and hence, the system 900 is configured to operate as the wireless charger (WC). In such a configuration, the transformer 108 of the OBC device 102 operates as the RX pad of the WC. The two isolated coils (i.e., the mains-side coil 108A and the battery-side coil 108B) of the RX pad of the WC operate in parallel. The system 900 resembles a series-series compensated inductive power transfer system. The first capacitor 116A (Cr1) and the second capacitor 118A (Cr2) form a resonant circuit with the leakage and magnetizing inductance. The second resonant frequency of the system 900 is given by equation 2

$$f_{r2} = \frac{1}{2\pi\sqrt{(L_{r1} + 2L_m)C_{r1}}} = \frac{1}{2\pi\sqrt{(L_{r2} + 2L_m)C_{r2}}} \quad (2)$$

The second resonant frequency of the WC can be designed approximately 85 kHz according to a standard J2954, which regulates the frequency of operation of the WC for electric vehicles (EVs), such as the electric vehicle 202 (of FIG. 2). Moreover, the directions of power flow are shown in the system 900 by use of three arrows. However, the directions of power flow can be reversed on an application basis.

Figure 10A:
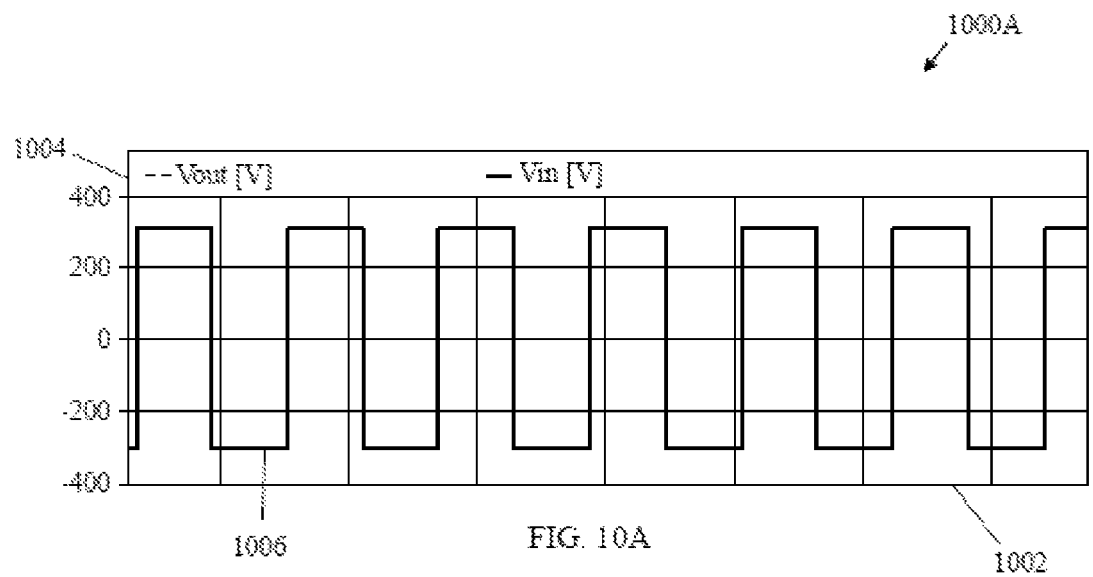
FIG. 10A is a graphical representation that illustrates voltage waveforms of the WC at a resonant frequency, in accordance with an example of the present disclosure.

FIG. 10A is a graphical representation that illustrates voltage waveforms of the WC at a second resonant frequency, in accordance with an embodiment of the present disclosure. FIG. 10A is described in conjunction with elements from FIGS. 1, 2, 3, 4, 5A, 6, and 9. With reference to FIG. 10A, there is shown a graphical representation 1000A that depicts voltage waveforms of the WC at a second resonant frequency. The system 900 (of FIG. 9) is configured to operate as the WC. The second resonant frequency of the WC can be designed, approximately 85 kHz.

The graphical representation 1000A includes an X-axis 1002 that depicts time. The graphical representation 1000A further includes a Y-axis 1004 that depicts an amplitude of voltage waveforms of the WC. A first waveform 1006 represents a voltage waveform of the WC at the second resonant frequency. Alternatively stated, the first waveform 1006 represents a voltage waveform (Vcon2) of the battery-side AC-to-DC converter 110 of the WC.

Figure 10B:
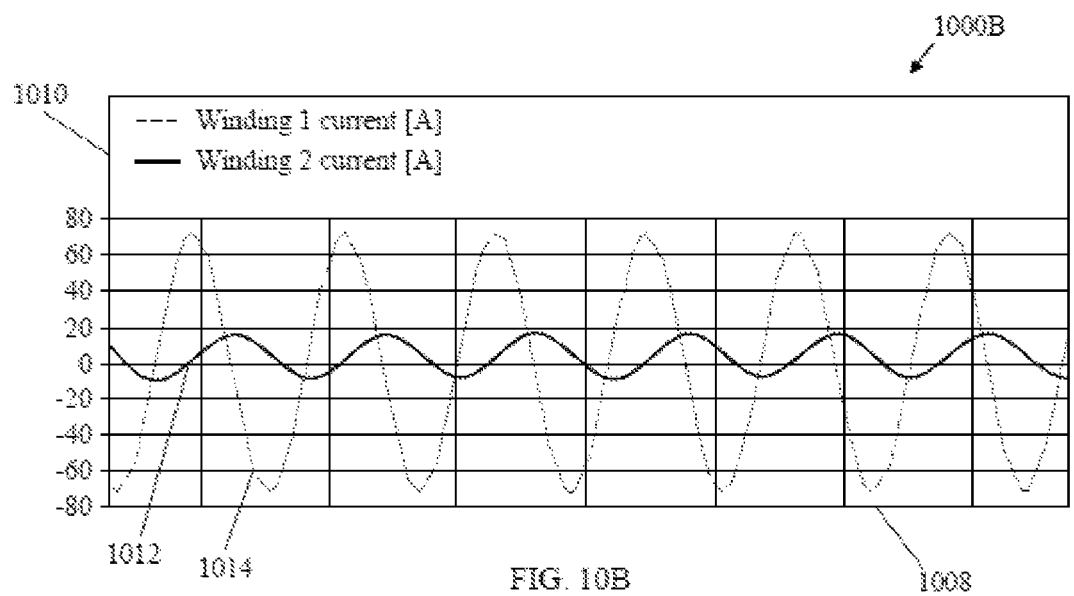
FIG. 10B is a graphical representation that illustrates current waveforms of the WC at a resonant frequency, in accordance with an example of the present disclosure.

FIG. 10B is a graphical representation that illustrates current waveforms of the WC at a second resonant frequency, in accordance with an embodiment of the present disclosure. FIG. 10B is described in conjunction with elements from FIGS. 1, 2, 3, 4, 5A, 6, 9, and 10A. With reference to FIG. 10B, there is shown a graphical representation 1000B that depicts current waveforms of the WC at a second resonant frequency. The system 900 (of FIG. 9) is configured to operate as the WC.

The graphical representation 1000B includes an X-axis 1008 that depicts time. The graphical representation 1000B further includes a Y-axis 1010 that depicts amplitude of current waveforms of the WC. A first waveform 1012 represents a current waveform (ilr2) flowing through the second inductance (lr2) of the battery-side resonant tank 118 of the WC at the resonant frequency. A second waveform 1014 represents a current waveform (Itx_coil) flowing through the TX pad 120A of the external WPT 120. The second waveform 1014 (Itx_coil) flowing through the TX pad 120A indicates a varying current which signifies that the external WPT 120 is in use when the system 900 operates as the WC.

Figure 11A:
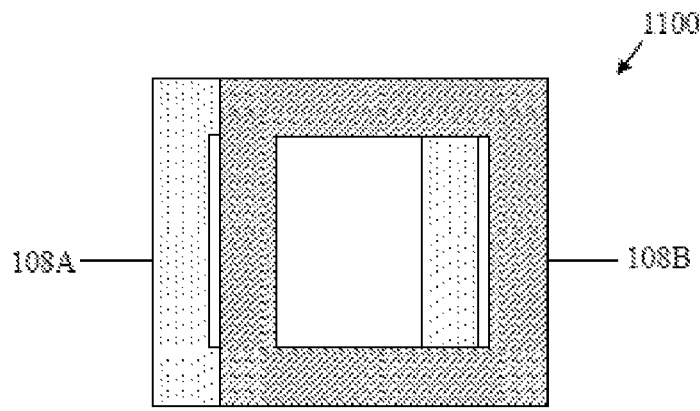
FIG. 11A is a schematic diagram that depicts coil structure of a transformer of an OBC device, in accordance with an example of the present disclosure.

FIG. 11A is a schematic diagram that depicts coil structure of a transformer of an OBC device, in accordance with an embodiment of the present disclosure. FIG. 11A is described in conjunction with elements from FIGS. 1, 4, 5A, 6, 7, and 9. With reference to FIG. 11A, there is shown a coil structure 1100A of the transformer 108 of the OBC device 102 (of FIG. 1). The transformer 108 includes the mains-side coil 108A and the battery-side coil 108B. Each of the mains-side coil 108A and the battery-side coil 108B may also be referred to as two galvanically isolated coils of the RX pad of the WC when the OBC device 102 is configured to operate with the external WPT 120.

Each of the mains-side coil 108A and the battery-side coil 108B is used to induce an embedded leakage inductance and a magnetizing inductance in the OBC device 102 and the WC as well. The ratio (k) between the magnetizing inductance and the embedded leakage inductance is controlled by adjusting the overlap between each of the mains-side coil 108A and the battery-side coil 108B. The overlapping of each of the mains-side coil 108A and the battery-side coil 108B can be done in different ways. For example, in the coil structure 1100A, each of the mains-side coil 108A and the battery-side coil 108B is displaced from its center point to create a partial overlap between the two coils.

Figure 11B:
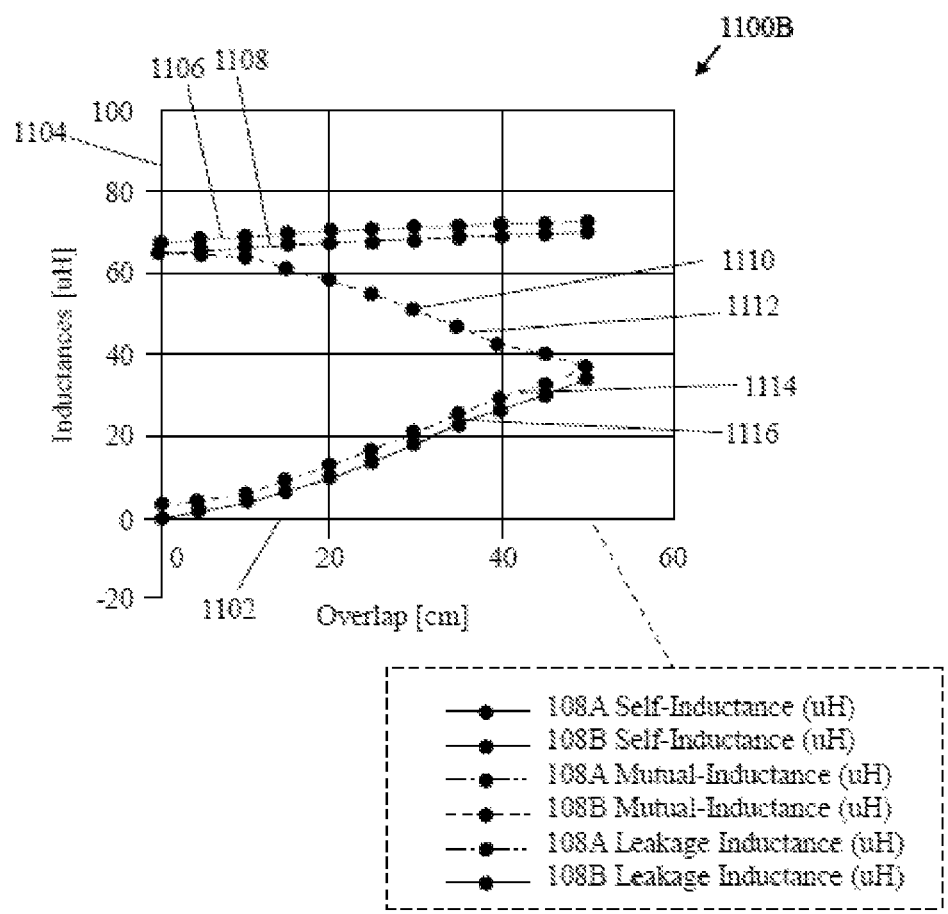
FIG. 11B is a graphical representation that illustrates leakage and mutual inductances induced by two coils of a transformer of an OBC device, in accordance with an example of the present disclosure.

FIG. 11B is a graphical representation that illustrates leakage and mutual inductances induced by two coils of a transformer of an OBC device, in accordance with an embodiment of the present disclosure. FIG. 11B is described in conjunction with elements from FIGS. 1, 4, 5A, 6, 7, 9, and 11A. With reference to FIG. 11B, there is shown a graphical representation 1100B that illustrates the embedded leakage and the mutual inductances induced by each of the mains-side coil 108A and the battery-side coil 108B of the transformer 108 of the OBC device 102.

The graphical representation 1100B includes an X-axis 1102 that depicts an overlap in centimeters (cm) between each of the mains-side coil 108A and the battery-side coil 108B. The graphical representation 1100B further includes a Y-axis 1104 that depicts inductances in microhenry (μH) induced by an overlap between each of the mains-side coil 108A and the battery-side coil 108B. A first line 1106 and a second line 1108 depict self-inductances (μH) of the mains-side coil 108A and the battery-side coil 108B, respectively. A third line 1110 and a fourth line 1112 depict mutual inductances (μH) or magnetizing inductances (μH) of the mains-side coil 108A and the battery-side coil 108B, respectively. A fifth line 1114 and a sixth line 1116 depict embedded leakage inductances (μH) of the mains-side coil 108A and the battery-side coil 108B, respectively. In the graphical representation 1100B, each of the mutual inductances and the embedded leakage inductances is obtained when each of the mains-side coil 108A and the battery-side coil 108B is displaced from their center points. The self-inductances, the mutual inductances and the embedded leakage inductances may be generated as a part of the WC as well.

Figure 12A:
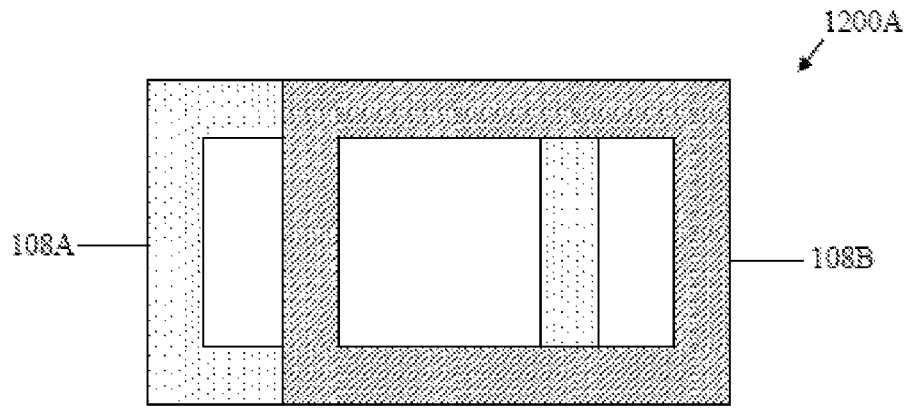
FIG. 12A is a schematic diagram that depicts coil structure of a transformer of an OBC device, in accordance with another example of the present disclosure.

FIG. 12A is a schematic diagram that depicts coil structure of a transformer of an OBC device, in accordance with another embodiment of the present disclosure. FIG. 12A is described in conjunction with elements from FIGS. 1, 4, 5A, 6, 7, 9, and 11A. With reference to FIG. 12A, there is shown a coil structure 1200A of the transformer 108 of the OBC device 102 (of FIG. 1). The transformer 108 includes the mains-side coil 108A and the battery-side coil 108B.

In the coil structure 1200A, each of the mains-side coil 108A and the battery-side coil 108B is stretched sideways to create a partial overlap between the two coils. Alternatively stated, edges of each of the mains-side coil 108A and the battery-side coil 108B are extended in one direction to create the partial overlap between the two coils. The partial overlap between each of the mains-side coil 108A and the battery-side coil 108B is used to regulate the ratio (k) between the magnetizing inductance and the embedded leakage inductances of the WC (i.e., the system 900).

Figure 12B:
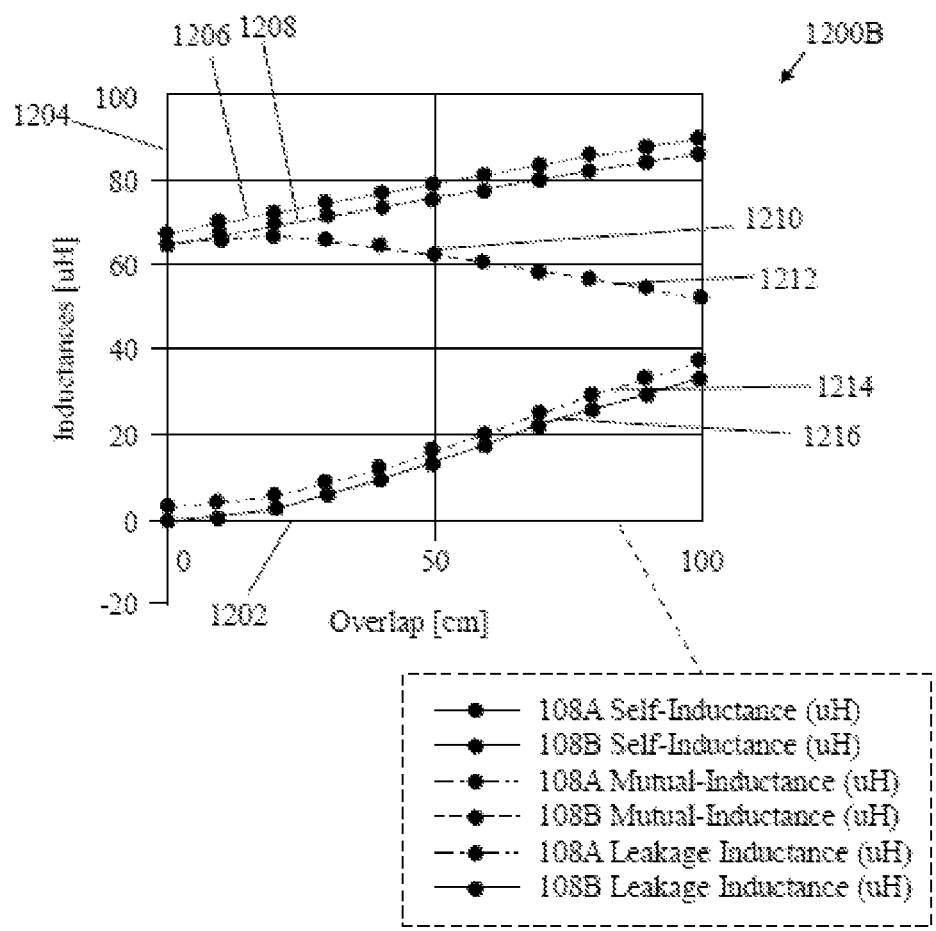
FIG. 12B is a graphical representation that illustrates leakage and mutual inductances induced by two coils of a transformer of an OBC device, in accordance with another example of the present disclosure.

FIG. 12B is a graphical representation that illustrates leakage and mutual inductances induced by two coils of a transformer of an OBC device, in accordance with another embodiment of the present disclosure. FIG. 12B is described in conjunction with elements from FIGS. 1, 4, 5A, 6, 7, 9, 11B, and 12A. With reference to FIG. 12B, there is shown a graphical representation 1200B that illustrates the embedded leakage and the mutual inductances induced by each of the mains-side coil 108A and the battery-side coil 108B of the transformer 108 of the OBC device 102.

The graphical representation 1200B includes an X-axis 1202 that depicts an overlap in centimeters (cm) between each of the mains-side coil 108A and the battery-side coil 108B. The graphical representation 1200B further includes a Y-axis 1204 that depicts inductances in microhenry (μH) induced by an overlap between each of the mains-side coil 108A and the battery-side coil 108B. A first line 1206 and a second line 1208 depict self-inductances (μH) of the mains-side coil 108A and the battery-side coil 108B, respectively. A third line 1210 and a fourth line 1212 depict mutual inductances (μH) or magnetizing inductances of the mains-side coil 108A and the battery-side coil 108B, respectively. A fifth line 1214 and a sixth line 1216 depict embedded leakage inductances (μH) of the mains-side coil 108A and the battery-side coil 108B, respectively. In the graphical representation 1200B, each of the mutual inductances and the embedded leakage inductances is obtained when each of the mains-side coil 108A and the battery-side coil 108B is stretched sideways. Each of the self-inductances, the mutual inductances and the embedded leakage inductances may be generated as a part of the WC as well.

Figure 13A:
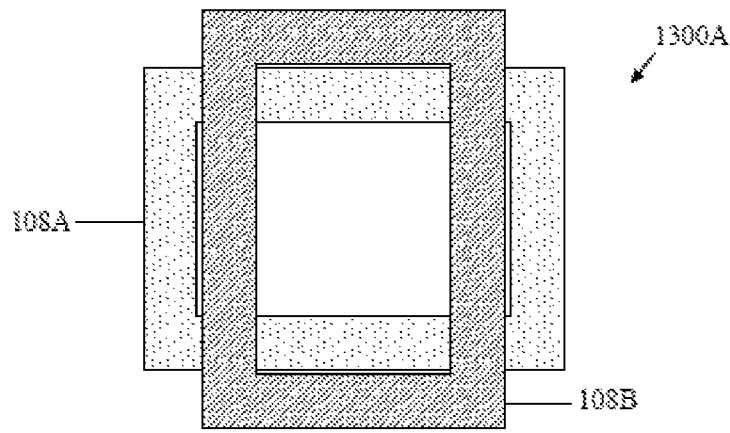
FIG. 13A is a schematic diagram that depicts coil structure of a transformer of an OBC device, in accordance with yet another example of the present disclosure.

FIG. 13A is a schematic diagram that depicts coil structure of a transformer of an OBC device, in accordance with yet another embodiment of the present disclosure. FIG. 13A is described in conjunction with elements from FIGS. 1, 4, 5A, 6, 7, 9, 11A, and 12A. With reference to FIG. 13A, there is shown a coil structure 1300A of the transformer 108 of the OBC device 102 (of FIG. 1). The transformer 108 includes the mains-side coil 108A and the battery-side coil 108B.

In the coil structure 1300A, each of the mains-side coil 108A and the battery-side coil 108B is stretched in different axes to create a partial overlap between the two coils. Alternatively stated, edges of each of the mains-side coil 108A and the battery-side coil 108B are extended in two different directions to create the partial overlap between the two coils. The partial overlap between each of the mains-side coil 108A and the battery-side coil 108B is used to regulate the ratio (k) between the magnetizing inductance and the embedded leakage inductances of the WC (i.e., the system 900).

Figure 13B:
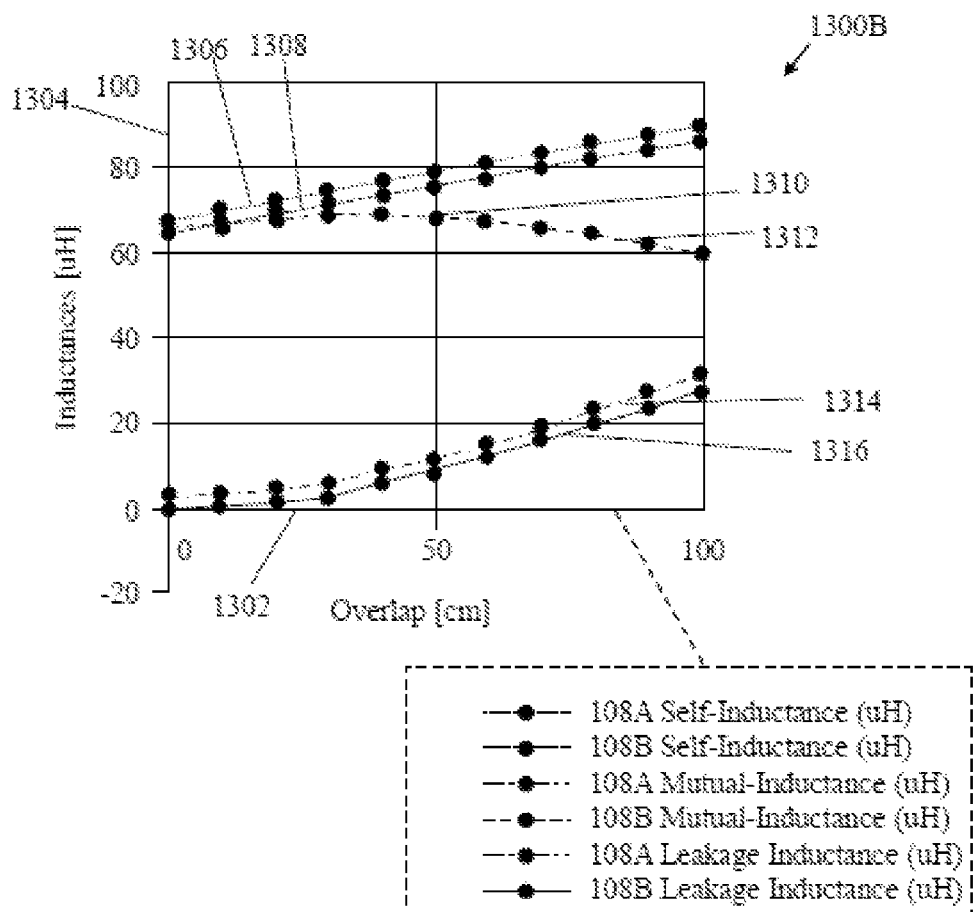
FIG. 13B is a graphical representation that illustrates leakage and mutual inductances induced by two coils of a transformer of an OBC device, in accordance with yet another example of the present disclosure.

FIG. 13B is a graphical representation that illustrates leakage and mutual inductances induced by two coils of a transformer of an OBC device, in accordance with yet another embodiment of the present disclosure. FIG. 13B is described in conjunction with elements from FIGS. 1, 4, 5A, 6, 7, 9, 11B, 12B, and 13A. With reference to FIG. 13B, there is shown a graphical representation 1300B that illustrates the embedded leakage and the mutual inductances induced by each of the mains-side coil 108A and the battery-side coil 108B of the transformer 108 of the OBC device 102.

The graphical representation 1300B includes an X-axis 1302 that depicts an overlap in centimeters (cm) between each of the mains-side coil 108A and the battery-side coil 108B. The graphical representation 1300B further includes a Y-axis 1304 that depicts inductances in microhenry (μH) induced by an overlap between each of the mains-side coil 108A and the battery-side coil 108B. A first line 1306 and a second line 1308 depict self-inductances (μH) of the mains-side coil 108A and the battery-side coil 108B, respectively. A third line 1310 and a fourth line 1312 depict mutual inductances (μH) or magnetizing inductances of the mains-side coil 108A and the battery-side coil 108B, respectively. A fifth line 1314 and a sixth line 1316 depict embedded leakage inductances (μH) of the mains-side coil 108A and the battery-side coil 108B, respectively. In the graphical representation 1300B, each of the mutual inductances and the embedded leakage inductances is obtained when each of the mains-side coil 108A and the battery-side coil 108B is stretched in two different directions. Each of the coil inductances, the mutual inductances and the embedded leakage inductances may be generated as a part of the WC as well.

Figure 14:
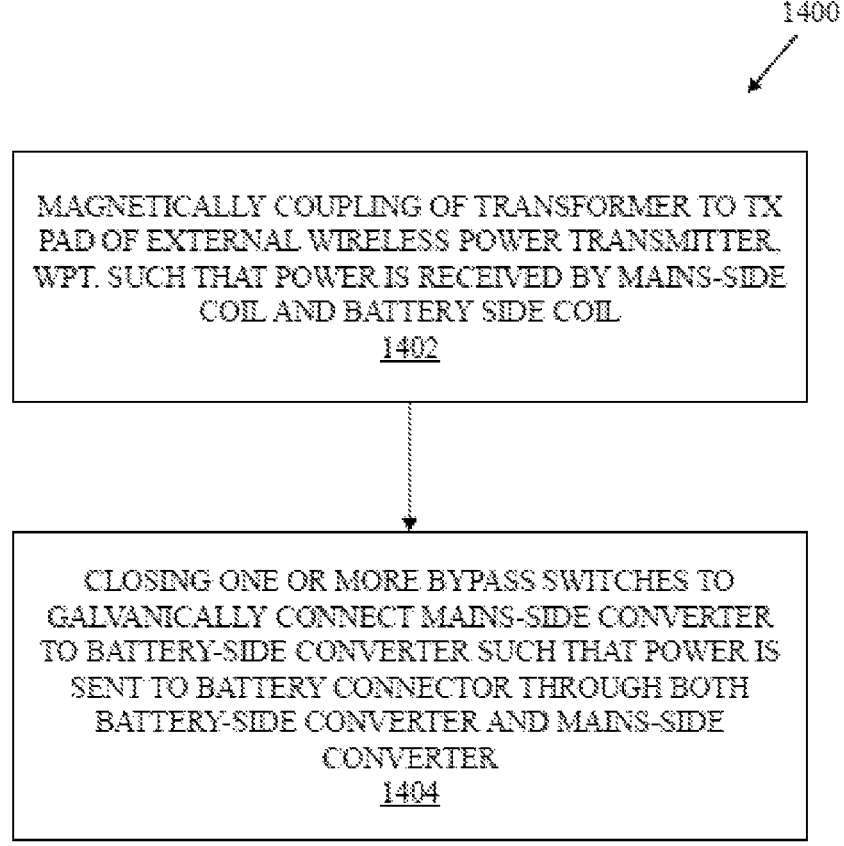
FIG. 14 is a flowchart of a method of charging an electric vehicle, in accordance with an example of the present disclosure.

FIG. 14 is a flowchart of a method of charging an electric vehicle, in accordance with an embodiment of the present disclosure. FIG. 14 is described in conjunction with elements from FIGS. 1, 2, 3, 4, 6, and 9. With reference to FIG. 14, there is shown a method 1400 of charging an electric vehicle, such as the electric vehicle 202 (of FIG. 2). The method 1400 includes 1402 and 1404 steps. The method 1400 is executed by the OBC device 102 (of FIG. 1) when the OBC device 102 is configured to operate with the WPT 120. Moreover, the method 1400 is also executed by the system 900 (of FIG. 9).

A method (i.e., the method 1400) of charging the electric vehicle 202, comprising: magnetically coupling the transformer 108 to a TX pad 120A of an external WPT 120, such that power is received by the mains-side coil 108A and the battery-side coil 108B; and closing the one or more bypass switches 114 (i.e., S1) to galvanically connect the mains-side converter (i.e., the mains-side DC-to-AC converter 106) to the battery-side converter (i.e., the battery side AC-to-DC converter 110) such that power is sent to the battery connector 112 through both the battery-side converter (i.e., the battery side AC-to-DC converter 110) and the mains-side converter (i.e., the mains-side DC-to-AC converter 106).

At step 1402, the method 1400 comprises magnetically coupling the transformer 108 to a TX pad 120A of an external WPT 120, such that power is received by the mains-side coil 108A and the battery-side coil 108B. When the OBC device 102 comprised by the electric vehicle 202 is configured to operate as wireless charger (WC), the transformer 108 is magnetically coupled to the TX pad 120A of the external WPT 120 in order to receive the power. The power is received by the mains-side coil 108A and the battery-side coil 108B of the transformer 108 in order to feed the energy to the mains-side DC-to-AC converter 106 and the battery-side AC-to-DC converter 110, simultaneously.

At step 1404, the method 1400 further comprises closing the one or more bypass switches 114 (i.e., S1) to galvanically connect the mains-side converter (i.e., the mains-side DC-to-AC converter 106) to the battery-side converter (i.e., the battery side AC-to-DC converter 110) such that power is sent to the battery connector 112 through both the battery-side converter (i.e., the battery side AC-to-DC converter 110) and the mains-side converter (i.e., the mains-side DC-to-AC converter 106). When the one or more bypass switches 114 (i.e., S1) are closed, and the transformer 108 is magnetically coupled to the TX pad 120A of the WPT 120, the mains-side DC-to-AC converter 106 and the battery-side AC-to-DC converter 110 are galvanically connected and together charge the battery 204 of the electric vehicle 202 through the battery connector 112.

In accordance with an embodiment, the WPT 120 is configured to operate at a resonant frequency in the range of 80-90 kHz. When the OBC device 102 is configured to operate as the WC, the WPT 120 is configured to operate at the resonant frequency in the range of 80-90 kHz.

The steps 1402 and 1404 are only illustrative and other alternatives can also be provided where one or more steps are added, one or more steps are removed, or one or more steps are provided in a different sequence without departing from the scope of the claims herein.

Figure 15:
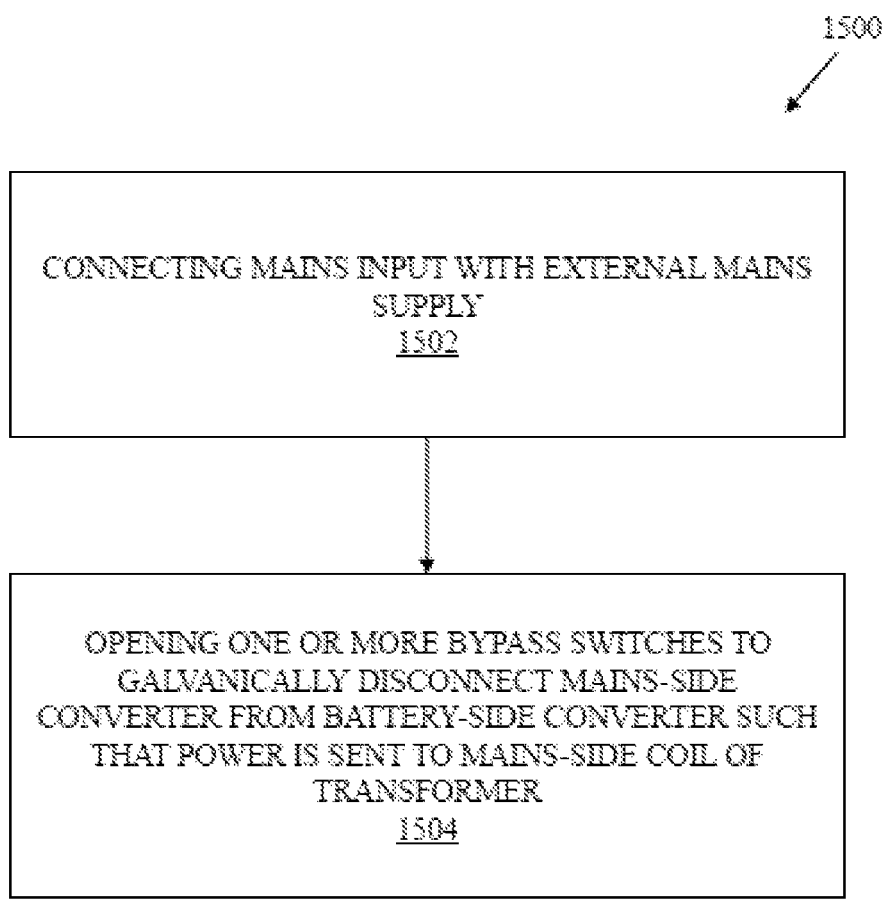
FIG. 15 is a flowchart of a method of charging an electric vehicle, in accordance with another example of the present disclosure.

FIG. 15 is a flowchart of a method of charging an electric vehicle, in accordance with another embodiment of the present disclosure. FIG. 15 is described in conjunction with elements from FIGS. 1, 2, 3, 4, 6, and 7. With reference to FIG. 15, there is shown a method 1500 of charging an electric vehicle, such as the electric vehicle 202 (of FIG. 2). The method 1500 includes 1502 and 1504 steps. The method 1500 is executed by the OBC device 102 (of FIG. 1), when the OBC device 102 is configured to operate with the mains input 104. Moreover, the method 1500 is also executed by the system 700 (of FIG. 7).

A method (i.e., the method 1500) of charging the electric vehicle 202, comprising: connecting the mains input 104 with an external mains supply; and opening the one or more bypass switches 114 (i.e., S1) to galvanically disconnect the mains-side converter (i.e., the mains-side DC-to-AC converter 106) from the battery-side converter (i.e., the battery side AC-to-DC converter 110) such that power is sent to the mains-side coil 108A of the transformer 108.

At step 1502, the method 1500 comprises connecting the mains input 104 with an external mains supply. The OBC device 102 comprised by the electric vehicle 202 is configured to operate depending on the mains input 104. For this, the mains input 104 is connected with the external mains supply.

At step 1504, the method 1500 further comprises opening the one or more bypass switches 114 (i.e., S1) to galvanically disconnect the mains-side converter (i.e., the mains-side DC-to-AC converter 106) from the battery-side converter (i.e., the battery side AC-to-DC converter 110) such that power is sent to the mains-side coil 108A of the transformer 108. When the one or more bypass switches 114 are open and the OBC device 102 is configured to operate with the mains input 104, the mains-side DC-to-AC converter 106 and the battery-side AC-to-DC converter 110 are galvanically disconnected from each other. In such configuration, the power from the mains input 104 is sent to the mains-side coil 108A of the transformer 108 and further, power is sent to the battery 204 of the electric vehicle 202 through the battery connector 112.

In accordance with an embodiment, the mains supply is configured to operate at a resonant frequency usually in the range of 200-600 kHz. The resonant frequency higher than the range of 200-600 kHz may also be used. The mains input 104 is connected with the external mains supply which is configured to operate at the resonant frequency in the range usually of 200-600 kHz.

The steps 1502 and 1504 are only illustrative, and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

The invention claimed is:

1. An on-board charging (OBC) device for an electric vehicle and comprising:
   a mains input circuit comprising a power factor correction (PFC) converter;
   a mains-side direct current-to-alternating current (DC/AC) converter;
   a transformer comprising a mains-side coil and a battery-side coil, wherein the mains-side coil comprises a first center point, wherein the battery-side coil comprises a second center point, wherein the mains-side coil is arranged at an offset overlap to the battery-side coil with the first center point being displaced from the second center point, and wherein the transformer is configured to:
      magnetically couple to a transmitter (TX) pad of an external wireless power transmitter (WPT); and
      receive first power at the mains-side coil and the battery-side coil from the WPT;
   a battery-side alternating current-to-direct current (AC/DC) converter;
   a battery connector; and
   at least one bypass switch configured to selectively close for galvanically connecting the DC/AC converter to the AC/DC converter,
   wherein the OBC device is configured to send second power to the battery connector via the AC/DC converter and the mains-side converter when the at least one bypass switch is closed and the transformer is magnetically coupled to the WPT.

2. The OBC device of claim 1, further comprising:
   a mains-side resonant tank having a first capacitance and a first inductance; and
   a battery-side resonant tank having a second capacitance and a second inductance, wherein each of the first capacitance, the first inductance, the second capacitance, and the second inductance are selectively configured to adapt the OBC device to operate with the mains input circuit and with the WPT.

3. The OBC device of claim 2, wherein each of the first capacitance, the first inductance, the second capacitance, and the second inductance is configured to correspond to a first resonant frequency of operation of the mains input circuit and to correspond to a second resonant frequency of operation of the WPT.

4. The OBC device of claim 3, wherein the transformer is configured to:
   operate with the mains input circuit at the first resonant frequency in the range of 200 kilohertz (kHz)-600 kHz; and
   operate with the WPT at the second resonant frequency in the range of 80 kHz-90 KHz.

5. The OBC device of claim 2, wherein the mains-side resonant tank comprises a first capacitor configured to generate the first capacitance, and wherein the battery-side resonant tank comprises a second capacitor configured to generate the second capacitance.

6. The OBC device of claim 3, wherein the mains-side resonant tank comprises a first capacitor configured to generate the first capacitance, and wherein the battery-side resonant tank comprises a second capacitor configured to generate the second capacitance.

7. The OBC device of claim 4, wherein the mains-side resonant tank comprises a first capacitor configured to generate the first capacitance, and wherein the battery-side resonant tank comprises a second capacitor configured to generate the second capacitance.

8. The OBC device of claim 2, wherein the mains-side coil and the battery-side coil are configured to be arranged with an offset overlap for simultaneously generating the first inductance and the second inductance.

9. The OBC device of claim 3, wherein the mains-side coil and the battery-side coil are configured to be arranged with an offset overlap for simultaneously generating the first inductance and the second inductance.

10. The OBC device of claim 4, wherein the mains-side coil and the battery-side coil are configured to be arranged with an offset overlap for simultaneously generating the first inductance and the second inductance.

11. The OBC device of claim 1, wherein each of the at least one bypass switch is a direct current switch.

12. The OBC device of claim 1, wherein each of the mains-side converter and the battery-side converter comprises at least one of a full bridge, a half bridge or a diode bridge.

13. An electric vehicle, comprising:
at least one battery; and
an on-board charging (OBC) device comprising:
a mains input circuit comprising a power factor correction (PFC) converter;
a mains-side direct current-to-alternating current (DC/AC) converter;
a transformer comprising a mains-side coil and a battery-side coil, wherein the mains-side coil comprises a first center point, wherein the battery-side coil comprises a second center point, wherein the mains-side coil is arranged at an offset overlap to the battery-side coil with the first center point being displaced from the second center point, and wherein the transformer is configured to:
magnetically couple to a transmitter (TX) pad of an external wireless power transmitter (WPT); and
receive first power at the mains-side coil and the battery-side coil from the WPT;
a battery-side alternating current-to-direct current (AC/DC) converter;
a battery connector; and
at least one bypass switch configured to selectively close for galvanically connecting the DC/AC converter to the AC/DC converter,
wherein the OBC device is configured to send second power to the battery connector via the AC/DC converter and the mains-side converter when the at least one bypass switch is closed and the transformer is magnetically coupled to the WPT.

14. The electric vehicle of claim 13, further comprising:
a mains-side resonant tank having a first capacitance and the first inductance; and
a battery-side resonant tank having a second capacitance and the second inductance, wherein each of the first capacitance, the first inductance, the second capacitance, and the second inductance are selectively configured to adapt the OBC device to operate with the mains input circuit and with the WPT.

15. The electric vehicle of claim 14, wherein each of the first capacitance, the first inductance, the second capacitance, and the second inductance is configured to correspond to a first resonant frequency of operation of the mains input circuit and to correspond to a second resonant frequency of operation of the WPT.

16. The OBC device of claim 15, wherein the transformer is configured to operate with the mains input circuit at the first resonant frequency in the range of 200 kilohertz (kHz)-600 kHz and is configured to operate with the WPT at the second resonant frequency in the range of 80 kHz-90 kHz.

17. A system for wirelessly charging an electric vehicle and comprising:
an external wireless power transmitter (WPT) comprising a transmitter (TX) pad; and
an electric vehicle coupled to the WPT wherein the electric vehicle comprises:
at least one battery; and
an on-board charging (OBC) device comprising:
a mains input circuit comprising a power factor correction (PFC), converter;
a mains-side direct current-to-alternating current (DC/AC) converter;
a transformer comprising a mains-side coil and a battery-side coil, wherein the mains-side coil comprises a first center point, wherein the battery-side coil comprises a second center point, wherein the mains-side coil is arranged at an offset overlap to the battery-side coil with the first center point being displaced from the second center point, and wherein the transformer is configured to:
magnetically couple to the TX pad of an external wireless power transmitter (WPT) to deliver wireless power to the transformer; and
receive the wireless power at the mains-side coil and the battery-side coil from the WPT;
a battery-side alternating current-to-direct current (AC/DC) converter;
a battery connector; and
at least one bypass switch configured to selectively close for galvanically connecting the DC/AC converter to the AC/DC converter,
wherein the OBC device is configured to send second power to the battery connector via the AC/DC converter and the mains-side converter when the at least one bypass switch is closed and the transformer is magnetically coupled to the WPT.

18. The system of claim 17, wherein the WPT is configured to operate at a resonant frequency in the range of 80 kilohertz (kHz)-90 KHz.

19. The system of claim 17, wherein the OBC device further comprises:
a mains-side resonant tank having a first capacitance and a first inductance; and
a battery-side resonant tank having a second capacitance and a second inductance, wherein each of the first capacitance, the first inductance, the second capacitance, and the second inductance are selectively configured to adapt the OBC device to operate with the mains input circuit and with the WPT.

20. The system of claim 19, wherein each of the first capacitance, the first inductance, the second capacitance, and the second inductance is configured to correspond to a first resonant frequency of operation of the mains input circuit and to correspond to a second resonant frequency of operation of the WPT.

* * * * *